(12) United States Patent
Kasahara et al.

(10) Patent No.: US 9,350,894 B2
(45) Date of Patent: May 24, 2016

(54) IMAGE CAPTURING SYSTEM

(71) Applicant: PFU Limited, Kahoku-shi, Ishikawa (JP)

(72) Inventors: Yuki Kasahara, Ishikawa (JP); Masanari Takabatake, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/230,923

(22) Filed: Mar. 31, 2014

(65) Prior Publication Data

US 2015/0181072 A1      Jun. 25, 2015

(30) Foreign Application Priority Data

Dec. 25, 2013   (JP) ................................. 2013-267613

(51) Int. Cl.
*H04N 1/04*        (2006.01)
*H04N 1/195*       (2006.01)
(Continued)

(52) U.S. Cl.
CPC ....... *H04N 1/19594* (2013.01); *H04N 1/00562* (2013.01); *H04N 1/0282* (2013.01); *H04N 2201/0081* (2013.01);
(Continued)

(58) Field of Classification Search
CPC ... H04N 1/38; H04N 1/3873; H04N 1/00795; H04N 1/40; H04N 2201/3274; H04N 1/02815; H04N 1/193; H04N 1/40056; H04N 1/1013; H04N 1/0287; H04N 1/19594; H04N 1/00562; H04N 1/0282; H04N 2201/0081; H04N 2201/0084; H04N 2201/0096; H04N 2201/0446

USPC ......... 358/474, 497, 475, 509, 505, 453, 486; 382/282

See application file for complete search history.

(56) References Cited

U.S. PATENT DOCUMENTS 6,088,470 A  *  7/2000  Camus et al. ................. 382/117
6,822,690 B2 *  11/2004  Iida .......................... H04N 1/40
                                                        348/362

(Continued)

FOREIGN PATENT DOCUMENTS

JP    07-007605 A    1/1995
JP    09-200440 A    7/1997
(Continued)

OTHER PUBLICATIONS

Notice of Rejection Japanese Patent Application No. 2013-267613 dated Feb. 10, 2015 with full English translation.

*Primary Examiner* — Cheukfan Lee
(74) *Attorney, Agent, or Firm* — McDermott Will & Emery LLP

(57) ABSTRACT

An image capturing system includes an image capturing unit to photograph a medium placed on a medium installation face, a lighting unit disposed in a top unit to irradiate the medium installation face, a lighting control unit to perform driving control of the lighting unit, a scan instruction unit to issue an instruction to perform scanning to photograph the medium and to generate image data of the medium, and a non-readable area determining unit to determine whether or not there is a non-readable area based on an image of the medium obtained by photographing the medium with in a turned-on state of the lighting unit. When there is the non-readable area, the scanning is performed by turning off the lighting unit when the lighting unit was in a turned-on state, and when there is not the non-readable area, the scanning is performed in the turned-on state of the lighting unit.

7 Claims, 15 Drawing Sheets

(51) Int. Cl.
*H04N 1/028* (2006.01)
*H04N 1/00* (2006.01)

(52) U.S. Cl.
CPC ........... *H04N 2201/0084* (2013.01); *H04N 2201/0096* (2013.01); *H04N 2201/0446* (2013.01)

(56) References Cited

U.S. PATENT DOCUMENTS

| | | | |
|---|---|---|---|
| 7,035,011 B2 * | 4/2006 | Wolf | 359/599 |
| 7,136,537 B2 * | 11/2006 | Pilu et al. | 382/274 |
| 7,146,027 B2 * | 12/2006 | Kim et al. | 382/117 |
| 7,203,362 B2 * | 4/2007 | Sato et al. | 382/173 |
| 7,630,002 B2 * | 12/2009 | Jenkins | G06F 3/0425 345/173 |
| 7,751,092 B2 * | 7/2010 | Sambongi | G06F 3/005 358/473 |
| 8,184,194 B2 * | 5/2012 | Sato et al. | 348/335 |
| 8,203,764 B2 * | 6/2012 | King et al. | 358/450 |
| 8,559,063 B1 * | 10/2013 | Booppanon | G03B 17/561 358/302 |
| 8,743,426 B2 * | 6/2014 | Cook et al. | 358/3.27 |
| 9,060,115 B2 * | 6/2015 | Takabatake | H04N 5/2256 |
| 9,137,430 B1 * | 9/2015 | Aono | H04N 5/23293 |
| 2006/0210295 A1 * | 9/2006 | Nakaya et al. | 399/75 |
| 2008/0231911 A1 * | 9/2008 | Scott | 358/474 |
| 2008/0316548 A1 * | 12/2008 | Yamauchi et al. | 358/475 |
| 2011/0013001 A1 * | 1/2011 | Craven-Bartle et al. | 348/61 |
| 2012/0314264 A1 * | 12/2012 | Kimura | 358/474 |
| 2012/0320262 A1 * | 12/2012 | Chung | H05B 37/0272 348/370 |
| 2013/0335787 A1 * | 12/2013 | Kawata | 358/474 |
| 2014/0139668 A1 * | 5/2014 | Short | G03B 15/00 348/143 |
| 2014/0160345 A1 * | 6/2014 | Takabatake | H04N 5/2256 348/370 |
| 2014/0160350 A1 * | 6/2014 | Takabatake | H04N 5/247 348/376 |
| 2014/0168506 A1 * | 6/2014 | Kasahara | H04N 5/2354 348/370 |
| 2014/0176735 A1 * | 6/2014 | Short | H04N 1/00267 348/207.1 |
| 2015/0117849 A1 * | 4/2015 | Kasahara | G03B 15/02 396/164 |
| 2015/0138609 A1 * | 5/2015 | Golding | H04N 1/00541 358/447 |

FOREIGN PATENT DOCUMENTS

| | | | |
|---|---|---|---|
| JP | 09-284481 A | | 10/1997 |
| JP | 10-327301 A | | 12/1998 |
| JP | 2001-268323 A | | 9/2001 |
| JP | 2001268323 A | * | 9/2001 |
| JP | 2002-033921 A | | 1/2002 |
| JP | 2003-032445 A | | 1/2003 |
| JP | 2004-150873 A | | 5/2004 |
| JP | 2005-062753 A | | 3/2005 |
| JP | 2005-072785 A | | 3/2005 |
| JP | 2005-303813 A | | 10/2005 |

* cited by examiner

IMAGE CAPTURING SYSTEM

CROSS-REFERENCE TO RELATED APPLICATIONS

This application is based upon and claims the benefit of priority from Japanese Patent Application No. 2013-267613, filed Dec. 25, 2013, the entire contents of which are incorporated herein by reference.

BACKGROUND OF THE INVENTION

1. Field of the Invention

The present invention relates to image capturing systems.

2. Description of the Related Art

When an object is photographed using an image capturing unit such as a camera, there are many cases where the object is photographed using not only natural light but also light emitted from a light source such as a fluorescent lamp or LEDs. However, when the object is photographed using light emitted from the light source, there are cases where the emission light is specularly reflected on the surface of a document depending on materials thereof, which degrades the quality of an image. Thus, there are conventional image reading devices in which a light source is arranged at a position facing a direction in which specularly-reflected light reflected on the document is not incident to the image capturing unit (for example, Japanese Laid-open Patent Publication No. 7-7605 and Japanese Patent No. 3759887). In addition, there is another technique for suppressing the degradation of the quality of the image due to specular reflection on the document in which two light sources are arranged and emit light in a time divisional manner, the object is photographed using the image capturing unit at the time of emitting light from each light source, and the two images are synthesized together (for example, Japanese Laid-open Patent Publication No. 2001-268323).

However, when the document that is the object is curved, a position at which specular reflection is made on the document may be different from a position at which specular reflection is made on a flat document. Accordingly, when the position of the light source is arranged at the position at which specularly reflected light reflected on the flat document travels toward a direction other than the direction for the image capturing unit, in a case where a document to be photographed is curved, there is concern that specularly reflected light reflected on the document travels toward the image capturing unit and is incident to the image capturing unit.

In addition, since specular reflection differs depending on materials of a document, there are cases where emission light emitted from the light source is not specularly reflected on the document. In such a case, even when two light sources are arranged, there are cases where it is not necessary to cause the two light sources to emit light in the time divisional manner and to synthesize two images. Accordingly, it is very difficult to appropriately decrease the degradation of the image quality due to specularly reflected light reflected from the document regardless of the form of the document.

SUMMARY OF THE INVENTION

It is an object of the present invention to at least partially solve the problems in the conventional technology.

According to an aspect of the present invention, an image capturing system comprises a base unit arranged on a medium installation face on which a medium to be read is placed; an arm unit extending upward from the base unit; a top unit extending from the arm unit so as to face the medium installation face; an image capturing unit configured to photograph the medium; a lighting unit disposed in the top unit and configured to irradiate the medium installation face; a lighting control unit configured to perform driving control of the lighting unit; a scan instruction unit configured to issue an instruction to perform scanning to photograph the medium by the image capturing unit, and to generate image data corresponding to the medium; and a non-readable area determining unit configured to determine whether or not there is a non-readable area at which information from the medium is unable to be read by the image capturing unit due to reflection of light that is emitted from the lighting unit and reflected at the medium, based on an image corresponding to the medium obtained by photographing the medium in a turned-on state of the lighting unit, after the instruction to perform scanning is issued and before the image data is generated. When the non-readable area determining unit determines that there is the non-readable area, the scanning is performed by turning off the lighting unit by the lighting control unit when the lighting unit is in a turned-on state, and when the non-readable area determining unit determines that there is not the non-readable area, the scanning is performed in the turned-on state of the lighting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an explanatory diagram of an image of a medium where a non-readable area is not generated with a lighting LED on;

FIG. 7 is an explanatory diagram of an image of a medium where a non-readable area is generated with the lighting LED on;

DETAILED DESCRIPTION OF THE PREFERRED EMBODIMENTS

Hereinafter, image capturing systems according to embodiments of the present invention will be described in detail with reference to the drawings. However, the present invention is not limited to such embodiments. In addition, in constituent elements of the embodiment described below, elements with which the constituent elements can be replaced by those skilled in the art or elements that are substantially the same as the constituent element are included.

First Embodiment

Figure 1:
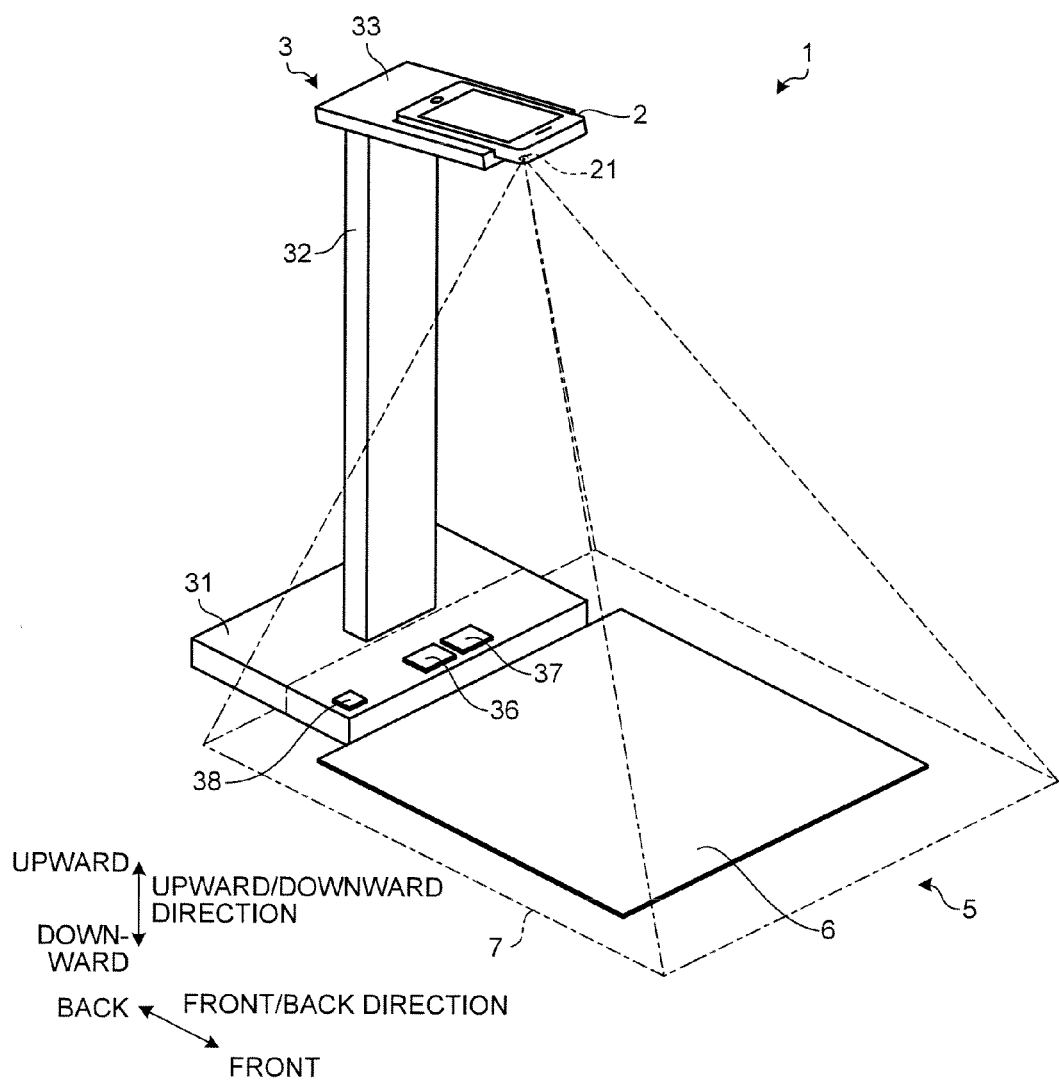
FIG. 1 is a schematic perspective view of a configuration of an image capturing system according to a first embodiment of the present invention.
Figure 2:
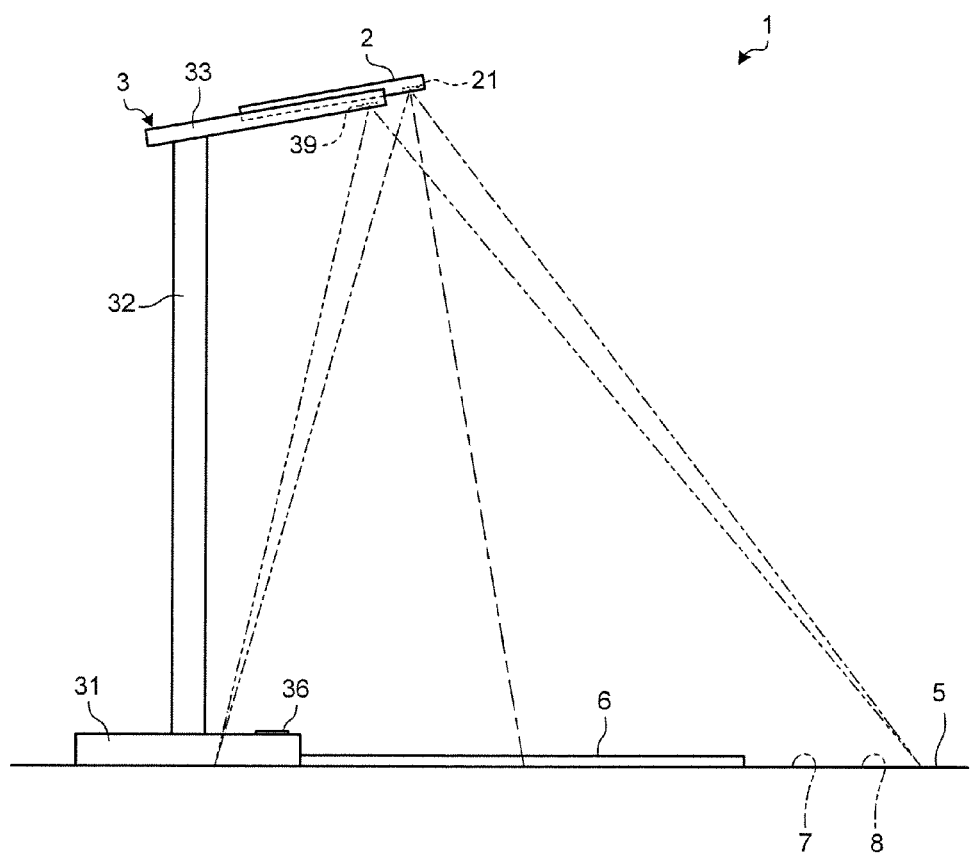
FIG. 2 is a side view of the image capturing system illustrated in FIG. 1.
Figure 3:
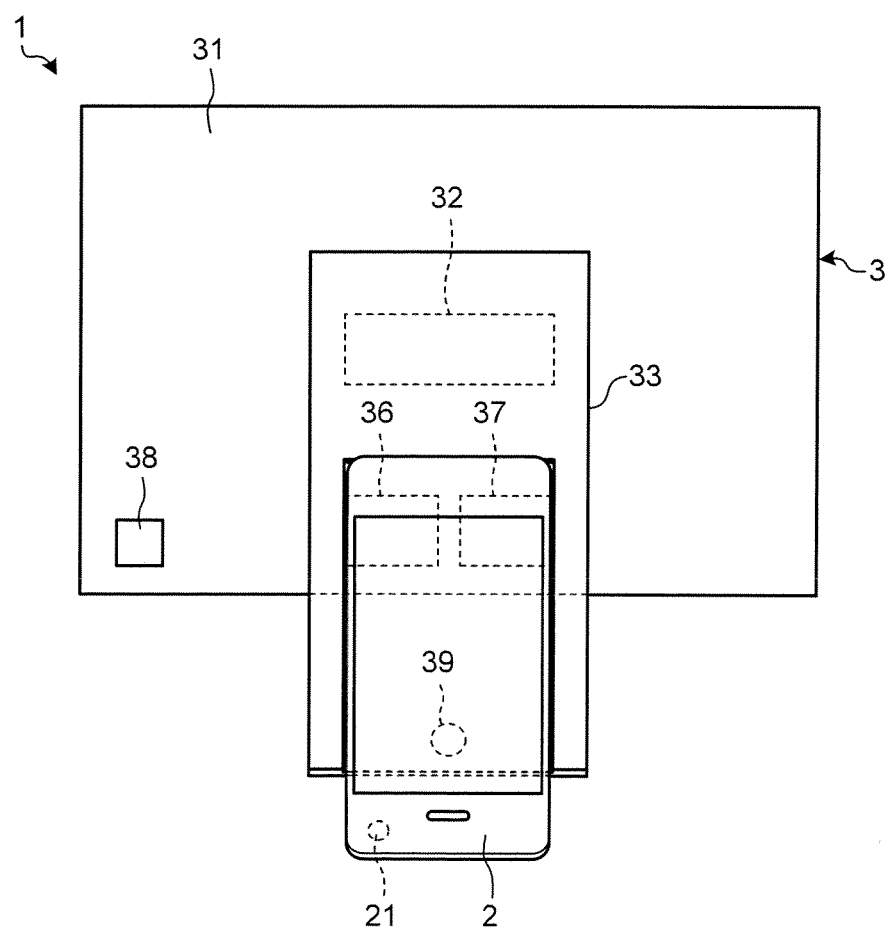
FIG. 3 is a plan view of the image capturing system illustrated in FIG. 1.

FIG. 1 is a perspective view that illustrates a schematic configuration of an image capturing system according to a first embodiment. FIG. 2 is a side view of the image capturing system illustrated in FIG. 1. FIG. 3 is a plan view of the image capturing system illustrated in FIG. 1. An image capturing system 1 illustrated in the FIGS. 1 to 3 is a scanner system that performs a scanning operation of generating image data of a medium 6 by photographing the medium 6 that is a reading target disposed on a medium installation face 5 from the upper side by a predetermined image capturing unit. In the first embodiment, as an example of the image capturing unit, a smartphone 2 having a camera function will be described. Here, "generating image data" described above denotes generating image data obtained as a product of the scanning operation, not just obtaining an image by photographing as usually performed by the smartphone 2.

The image capturing system 1 according to the first embodiment is equipped with a smartphone 2 and a lighting device 3 which can mount the smartphone 2 at the time of scanning by performing photographing using the smartphone 2. When the smartphone 2 is mounted at a predetermined position (on a mounting face 34 to be described later) of the lighting device 3, the image capturing system 1 can position the smartphone 2 precisely and can acquire a scan image of a predetermined area 7 to be photographed (hereinafter, photographed area 7) using the smartphone 2. In the description presented below, the upward/downward direction in FIG. 1 will be described as the upward/downward direction of the image capturing system 1 and the lighting device 3, the front side in FIG. 1 will be described as the front direction of the image capturing system 1 and the lighting device 3, and the rear side in FIG. 1 will be described as the back direction of the image capturing system 1 and the lighting device 3. That is, with respect to the image capturing system 1, specifically, with respect to a base unit 31, as disclosed in FIG. 1, a side facing the medium 6 is defined as the front side of the image capturing system 1 and the lighting device 3, and an opposite side to the front side is defined as the back side of the image capturing system 1 and the lighting device 3. A direction from the back side of the image capturing system 1 toward the front side of the image capturing system is defined as a front direction, and a direction opposite to the front direction is defined as a back direction.

On the rear face of the smartphone 2, an image capturing unit 21 performing a camera function is disposed. The image capturing unit 21 can perform a scanning operation (here, "scanning operation" means photographing a predetermined photographed area 7, as described in the specification later) in accordance with an operation instruction transmitted from a CPU 28 (FIG. 5) of the smartphone 2. In a state in which the smartphone 2 is mounted on the mounting face 34 of the lighting device 3, the image capturing unit 21 can photograph the entirety of a predetermined photographed area 7 and generate a scanned image (i.e., a photographed image) including the entirety of the photographed area 7.

The lighting device 3 is equipped with three members of a base unit 31, an arm unit 32, and a top unit 33. Among these, the base unit 31 is arranged on the medium installation face 5. The arm unit 32 is connected to the upper face of the base unit 31 and upwardly extends from the base unit 31. Here, the extending direction of the arm unit 32, as illustrated in FIGS. 1 to 3, may be a vertically upward direction or a direction inclined to the front side (the side on which the medium 6 is disposed) or the back side (a side opposite to the side on which the medium 6 is disposed) from the vertically upward direction.

The top unit 33 is connected to the arm unit 32 and extends from the arm unit 32 so as to face the medium installation face 5. In the first embodiment, as illustrated in FIG. 2, the top unit 33 is connected to an upper end portion of the arm unit 32, extends to the front side at a position of a height at which the arm unit 32 is connected, and extends toward the upward inclination from the horizontal direction.

The base unit 31, the arm unit 32, and the top unit 33 of the lighting device 3 are integrally fixed. In other words, a connection portion between the base unit 31 and the arm unit 32 and a connection portion between the arm unit 32 and the top unit 33 are fixedly disposed so as not to be deformed such as being rotated, detached/attached, or moved.

Figure 4:
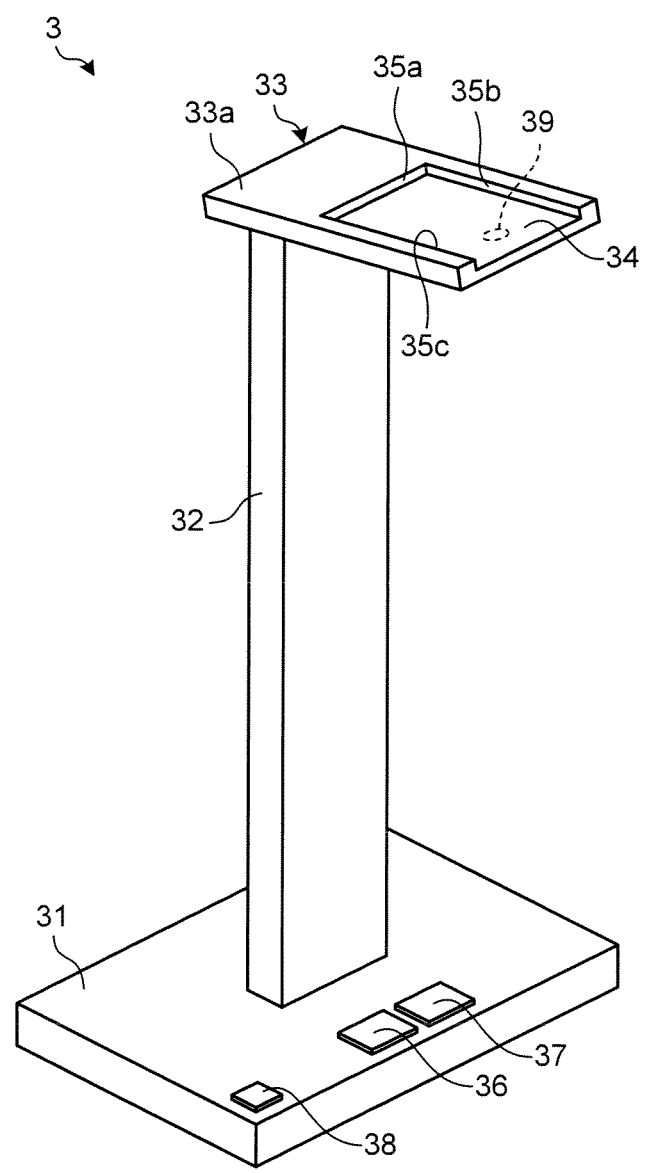
FIG. 4 is a perspective view of the lighting device illustrated in FIG. 1.

FIG. 4 is a perspective view of the lighting device illustrated in FIG. 1. On an upper face 33a of the top unit 33 of the lighting device 3, a mounting face 34 which is used for mounting the smartphone 2 is disposed at a position where the smartphone 2 can photograph the medium 6 disposed on the medium installation face 5.

The mounting face 34 is formed by being recessed from the upper face 33a of the top unit 33. The mounting face 34 is disposed such that a part of rear face of the smartphone 2 in the longitudinal direction thereof protrudes from the distal end of the top unit 33 when the smartphone 2 is mounted. In other words, the mounting face 34 is formed from the front end of the top unit 33 over the rear side (the direction of the arm unit 32) thereof, and the area of the mounting face 34 is smaller than the area of the rear face of the smartphone 2. In addition, the length of the mounting face 34 in the front/back direction is shorter than the length of the smartphone 2 in the longitudinal direction. Accordingly, the smartphone 2 can be mounted on the mounting face 34 with the image capturing unit 21 disposed on the rear face of the smartphone 2 not being hidden by the mounting face 34. In other words, when the smartphone 2 is mounted on the mounting face 34, the image capturing unit 21 is positioned so as to directly face the medium installation face 5, and accordingly, the image capturing unit 21 can image the medium 6 disposed on the medium installation face 5. In addition, by forming the mounting face 34 as such, smooth mounting and dismounting of the smartphone 2 is available.

Between the upper face 33a of the top unit 33 and the mounting face 34, steps or steps are formed. More specifically, a step 35a which is brought into contact with the lower portion of the smartphone 2 in the longitudinal direction and steps 35b and 35c which are brought into contact with right and left side faces of the smartphone 2. Namely, the steps 35a, 35b, and 35c are provided so as to abut the smartphone 2 from three directions. The steps 35a and 35b are connected at an approximately right angle, the steps 35a and 35c are connected at an approximately right angle, and the steps 35b and 35c are arranged in parallel with the front/back direction. By bringing such steps 35a, 35b, and 35c into contact with the smartphone 2, the position of the smartphone 2 can be determined to be a predetermined position. In other words, the steps 35a, 35b, and 35c formed between the upper face 33a of the top unit 33 and the mounting face 34 serve as a positioning unit which is used for positioning the smartphone 2 at a predetermined position on the mounting face 34.

Thus, when the smartphone 2 is mounted on the mounting face 34, by only causing the lower portion of the smartphone 2 in the longitudinal direction to abut against the step 35a, the smartphone 2 can be mounted by being easily positioned at a predetermined position on the mounting face 34. In addition, as described above, since the top unit 33 is inclined, the mounting face 34 is disposed to be inclined in the downward direction with respect to the horizontal direction from the front side to the rear side of the top unit 33. Accordingly, it is easy to cause the smartphone 2 to abut against the step 35a.

The installation position of the mounting face 34 is set such that there is a distance between the image capturing unit 21 of the smartphone 2 and the medium installation face 5 to some degree for which the entirety of a predetermined photographed area 7 disposed on the lower side can be imaged when the smartphone 2 is mounted on the mounting face 34. Described in more detail, the mounting face 34 is configured such that, when the smartphone 2 is mounted on the mounting face 34, the photographed area 7 of the smartphone 2 includes an area in which the medium 6, which neighbors to the front side of the base unit 31 of the lighting device 3, is arranged and a front-side upper face portion of the base unit 31.

In addition, on the upper face of the base unit 31 of the lighting device 3, a scan switch 36, a lighting switch 37, and a power switch 38 are disposed. Furthermore, on the lower face of the top unit 33 of the lighting device 3 which faces the medium installation face 5, a lighting light emitting diode (LED) 39 is disposed. The scan switch 36, the lighting switch 37, the power switch 38, and the lighting LED 39 are electrically connected to a control unit 40 (see FIG. 5) which is equipped inside the lighting device 3. Such switches may be disposed at positions other than on the top face of the base unit 31. For example, the power switch 38 may be disposed on the rear face of the base unit 31. In addition, instead of disposing the power switch 38 in the lighting device 3, the lighting device 3 may be turned on/off by plugging or unplugging a plug-in plug included in the lighting device 3 into a plug socket.

The scan switch 36 is an input unit which receives an instruction of a scan manipulation which causes the smartphone 2 to perform a scanning operation from the user. Specifically, the scan switch 36 is also a scan instruction unit which generates a scanning instruction to photograph the medium 6 by the smartphone 2 and generate image data corresponding to the medium 6. In addition, the lighting switch 37 is an input unit which is used for switching over On and Off of the lighting LED 39 and for adjusting the amount of light emitted from the lighting LED 39. In addition, the power switch 38 is a switch which switches over conduction and non-conduction between an external power supply 50 (see FIG. 5) and the lighting device 3. In addition, the lighting LED 39 is arranged on the lower face of the top unit 33 such that an emission range 8 at the time of emission is substantially the same as the photographed area 7 of the smartphone 2, and the photographed area 7 can be evenly lighted.

Figure 5:
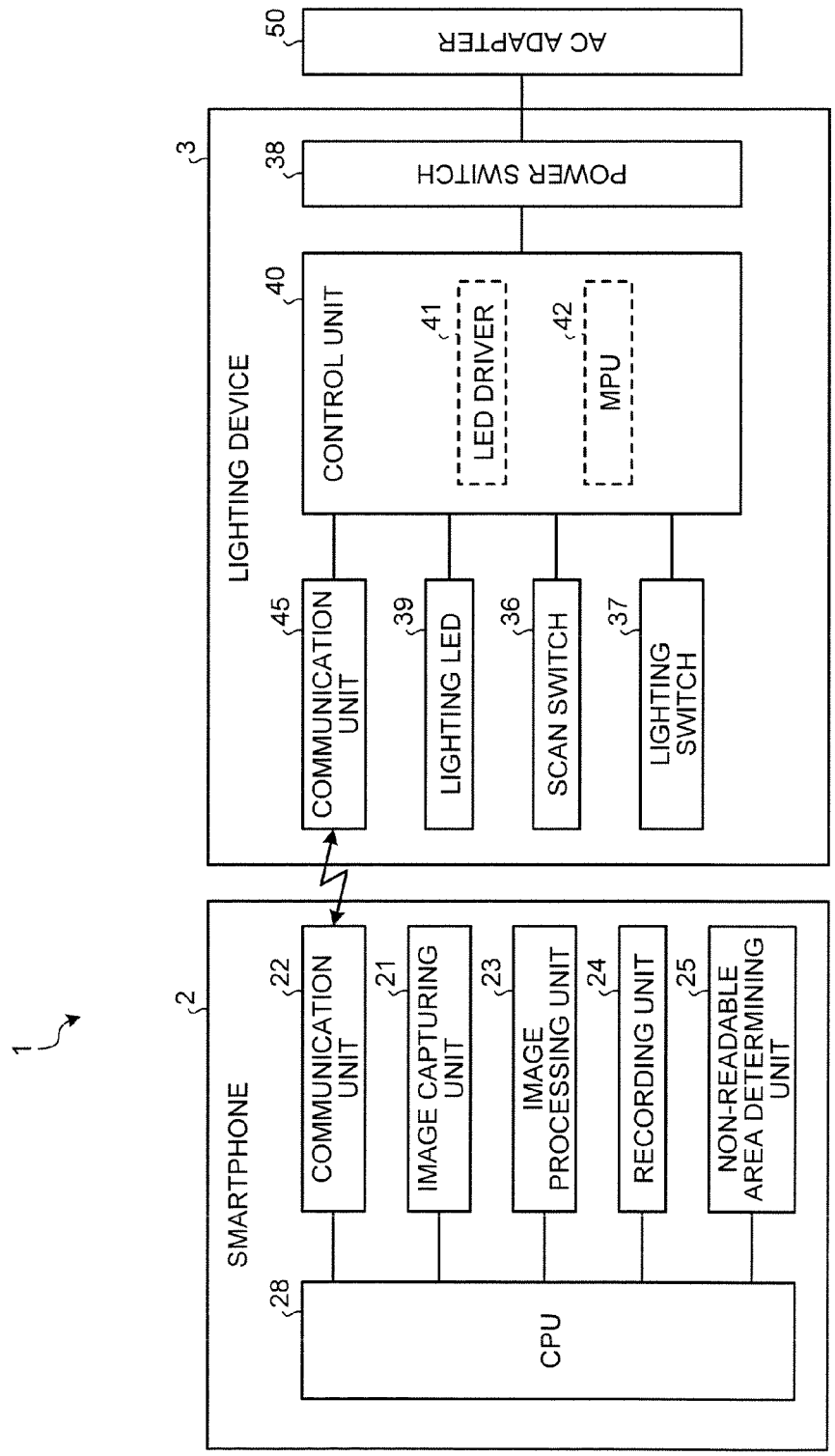
FIG. 5 is a functional block diagram of the image capturing system illustrated in FIG. 1.

FIG. 5 is a functional block diagram of the image capturing system illustrated in FIG. 1. The smartphone 2 configuring the image capturing system 1 together with the lighting device 3 is equipped with the image capturing unit 21, a communication unit 22, an image processing unit 23, a recording unit 24, a non-readable area determining unit 25, and the central processing unit (CPU) 28. The image capturing unit 21, the communication unit 22, the image processing unit 23, the recording unit 24, and the non-readable area determining unit 25 are electrically connected to the CPU 28.

The communication unit 22 is configured to be capable of communicating with the lighting device 3 and, for example, performs wireless communication using the Bluetooth (registered trademark). The communication with the lighting device 3 may be performed using a technique other than the Bluetooth, and any technique such as the near field communication (NFC) or the infrared communication which is capable of performing communication between the smartphone 2 mounted on the mounting face 34 and the lighting device 3 may be used.

The image processing unit 23 is a part which performs arbitrary image processing for an image captured by the image capturing unit 21. The image processing unit 23, for example, performs image processing for the image of the medium 6 which is captured by the image capturing unit 21 of the smartphone 2 mounted on the inclined mounting face 34 of the top unit 33 from the upper side of the inclination of the medium 6 disposed on the medium installation face 5 to be an image acquired by photographing the medium 6 from the upper side in the vertical direction. The recording unit 24 is a storage device which stores read data acquired by the image capturing unit 21 and image data acquired by performing image processing using the image processing unit 23.

The non-readable area determining unit 25 determines whether or not there is a non-readable area from which information of the medium 6 cannot be read by the smartphone 2 due to reflected light of the lighting LED 39 which is reflected on the medium 6. Described in more detail, in a case where the medium 6 which is an object is formed to have a high degree of smoothness of the surface and to have a gloss in the surface, when the medium 6 is irradiated with emission light emitted from the lighting LED 39, there are cases where the emission light is specularly reflected on the surface of the medium 6. In a case where the reflected light which has been specularly reflected travels toward the image capturing unit 21 of the smartphone 2 and is incident to the image capturing unit 21, at a portion of the medium 6 where the reflected light is reflecting, the luminance level becomes too high for the smartphone 2 to read information of the portion of the medium 6, due to the reflected light. In other words, in a case where the emission light emitted from the lighting LED 39 is specularly reflected on the surface of the medium 6, there are cases where a non-readable area at which information of the medium 6 cannot be read by the smartphone 2 may be generated on the medium 6 due to the reflected light. The non-readable area determining unit 25, after performing an instruction of scanning by an input operation to the scan switch 36, and before generating the image data of the medium 6, determines whether or not there is a non-readable area based on an image corresponding to the medium 6 which is acquired by photographing in the turned-on state of the lighting LED 39.

The CPU 28 performs various calculation processes at the time of communication with the lighting device 3 in the communication unit 22, at the time of a photographing process performed by the image capturing unit 21, at the time of image processing performed by the image processing unit 23, at the time of determining whether or not there is a non-readable area in the non-readable area determining unit 25, and the like.

On the other hand, the lighting device 3 is equipped with a communication unit 45, the lighting LED 39, the scan switch 36, the lighting switch 37, the power switch 38, and the control unit 40. The communication unit 45, the lighting LED 39, the scan switch 36, the lighting switch 37, and the power switch 38 are electrically connected to the control unit 40.

The communication unit 45 is configured to be capable of communicating with the communication unit 22 of the smartphone 2 using the Bluetooth or the like. The smartphone 2 and the lighting device 3 can communicate with each other through wireless communication using the communication units 22 and 45 thereof.

The control unit 40 includes an LED driver 41 and a micro processing unit (MPU) 42. Of these, the LED driver 41 is configured to cause the lighting LED 39 to emit light by adjusting power supplied to the lighting LED 39. Accordingly, the control unit 40 including the LED driver 41 is arranged also as a lighting control unit which performs driving control of the lighting LED 39. In addition, the MPU 42 is arranged to perform light emission control of the lighting LED 39 and control of the communication between the lighting device 3 and the smartphone 2 by transmitting a control signal to the LED driver 41 or the communication unit 45 in accordance with an input manipulation of the scan switch 36 or the lighting switch 37.

The power switch 38 is interposed between the AC adaptor 50 connected to an external power supply and the control unit 40 and can perform switching over the operation and the stop of the lighting device 3 by performing switching over conduction (On) and non-conduction (Off) between the control unit 40 and the external power supply in accordance with an input manipulation.

The image capturing system 1 according to the first embodiment is configured as described above, and, hereinafter, the operation thereof will be described. Generally, the lighting device 3 configuring the image capturing system 1 is used in a lighting stand. When the lighting device 3 is used as a lighting stand, an input manipulation such as a depressing operation is performed for the lighting switch 37 with the power switch 38 being in the On state. An input to this lighting switch 37 may be other than a strong depression and thus may be a tap on the lighting switch 37 or a contact (touch) with the lighting switch 37 according to the form of the lighting switch 37. The MPU 42 which has detected a depression on the lighting switch 37 turns on the lighting LED 39 through the LED driver 41. Accordingly, the lighting LED 39 emits light for the emission range 8, and the lighting device 3 can light the lower side of the top unit 33 using the light emitted from the lighting LED 39. When the lighting LED 39 which is in the turn-on state is turned off, an input manipulation such as a depressing operation is performed for the lighting switch 37 in the state in which the lighting LED 39 is turned on. As a result, the MPU 42 turns off the lighting LED 39 through the LED driver 41.

In addition, in the image capturing system 1 according to the first embodiment, the lighting device 3 is used not only as a lighting stand, but, by setting the smartphone 2 in the lighting device 3, the medium 6 can be scanned by reading the medium 6 which is installed on the medium installation face 5 by using the smartphone 2. In the scanning of the medium 6, image data is generated by using a method of generating image data according to the first embodiment, whereby the image of the medium 6 is acquired. The scanning of the medium 6 in the image capturing system 1 will be described. When the medium 6 is scanned, the smartphone 2 is mounted on the mounting face 34 of the top unit 33 so as to position the image capturing unit 21 of the smartphone 2 on the lower side in a direction in which the image capturing unit 21 is exposed from the top unit 33.

The smartphone 2 and the lighting device 3 are configured to transmit and receive information thereof by performing communication between the communication unit 22 of the smartphone 2 and the communication unit 45 of the lighting device 3. In addition, the smartphone 2 can perform a photographing operation in accordance with the reception of a control signal which is transmitted from the lighting device 3. In the image capturing system 1, the start of scanning is triggered upon the depression of the scan switch 36. In other words, the turning-on of the scan switch 36 is a trigger for the scanning performed by the image capturing system 1, and functions as an instruction to start scanning (hereinafter, scan-start instruction) for the image capturing system 1. Accordingly, the smartphone 2 mounted in the top unit 33 of the lighting device 3 continues to wait for the reception of a scan start trigger transmitted from the lighting device 3 in the communication unit 22.

In this state, when the scan switch 36 of the lighting device 3 is depressed by the user, a scan start trigger is transmitted from the lighting device 3 to the smartphone 2. This scan start trigger is transmitted from the communication unit 45 of the lighting device 3 and is received by the communication unit 22 of the smartphone 2. The smartphone 2 which has received the scan start trigger makes a turn-on instruction for the lighting LED 39 included in the lighting device 3. The lighting device 3 which has been instructed to turn on the lighting LED 39 from the smartphone 2 maintains the turned-on state of the lighting LED 39 in a case where the lighting LED 39 is in the turned-on state at the time of receiving the turn-on instruction and turns on the lighting LED 39 in a case where the lighting LED 39 is in the turned-off state at that time.

Figure 6:
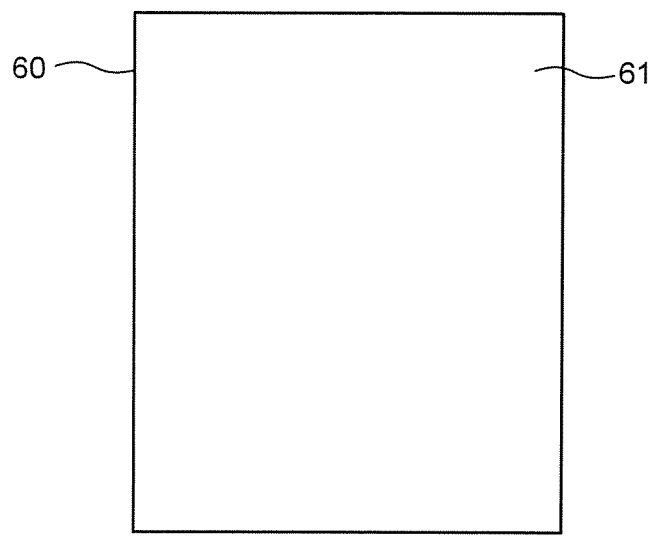
Figure 7:
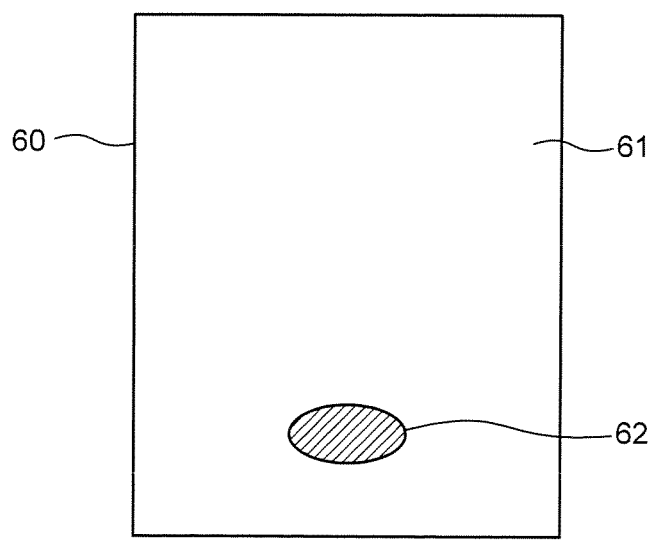

In the state in which the lighting LED 39 is turned on as above, the smartphone 2, before storing the image data of the medium 6, determines whether or not there is a non-readable area based on the image data corresponding to the medium 6 which has been acquired through the photographing process in the turned-on state of the lighting LED 39. FIG. 6 is a schematic diagram illustrating an image which is in a state where there is no non-readable area on the medium when the lighting LED is turned on. FIG. 7 is a schematic diagram illustrating an image which is in a state in which the non-readable area occurs on the medium when the lighting LED is turned on. When the lighting LED 39 is turned on, depending on materials of the medium 6, there are cases where emission light emitted from the lighting LED 39 is specularly reflected on the medium 6, the specularly reflected light is incident to the image capturing unit 21 of the smartphone 2, and accordingly, a non-readable area 62 from which information of the medium 6 cannot be read by the smartphone 2 occurs. The image capturing system 1 determines whether or not the non-readable area 62 occurs based on image data 60 of the photographed area 7 which is constantly photographed by the image capturing unit 21 by using the non-readable area determining unit 25 of the smartphone 2.

In other words, after the scan switch 36 is depressed, the smartphone 2 reads the medium 6 and waits in a state in which the photographed area 7 is constantly photographed by the image capturing unit 21 even before the image data 60 is stored. Accordingly, the non-readable area determining unit 25 determines whether there is the non-readable area 62 based on the image data 60 of the medium 6 which has been acquired by performing the photographing process using the image capturing unit 21. The smartphone 2 changes the process at the time of photographing the medium 6 based on whether or not there is the non-readable area 62.

First, when it is determined that there is no non-readable area 62 in the image data 60 (See FIG. 6), the medium 6 within the photographed area 7 is photographed by capturing an image of the photographed area 7 on the medium installation face 5 by using the image capturing unit 21 in the state in which the lighting LED 39 is turned on, and the image data 60 is stored in the recording unit 24 of the smartphone 2. Accordingly, the image capturing system 1 photographs the medium 6 under an optimal environment created by the lighting LED 39, and in a state where all of the areas in a captured image of the medium 6 become a readable area 61, thereby scanning the medium 6. When the image data 60 acquired through this scanning process is stored in the recording unit 24, after generating an appropriate image data 60 by adjusting the image data to have an appropriate image quality through image processing performed in the image processing unit 23 included in the smartphone 2, the image data 60 is stored by being recorded in the recording unit 24.

On the other hand, when it is determined that there is the non-readable area 62 on the medium 6 due to light emitted from the lighting LED 39 (See FIG. 7), the lighting LED 39 in the turned-on state, is turned off, and the medium 6 is photographed in this state. In the case where the lighting LED 39 is turned off, the medium 6 is not irradiated with emission light emitted from the lighting LED 39. Accordingly, the emission light emitted from the lighting LED 39 is not reflected on the medium 6, and the non-readable area 62 due to the reflection of the emission light emitted from the lighting LED 39 on the medium 6 does not occur (see FIG. 6).

In this state, the image capturing unit 21 photographs the medium 6 on which the non-readable area 62 is not occurring by photographing the photographed area 7 on the medium installation face 5, and stores the image data 60 in the recording unit 24 of the smartphone 2. In this manner, the image capturing system 1 photographs and scans the medium 6 in a state where the non-readable area 62 is not occurring and the entire area of the image of the medium 6 to be photographed becomes the readable area 61. When storing the image data 60 obtained by this scanning in the recording unit 24, the image processing unit 23 of the smartphone 2 processes the image data 60 to have an appropriate image quality, and generates appropriate image data 60, in the turned-off state of the lighting LED 39. Thereafter, the image data 60 is recorded and stored in the recording unit 24.

Figure 8:
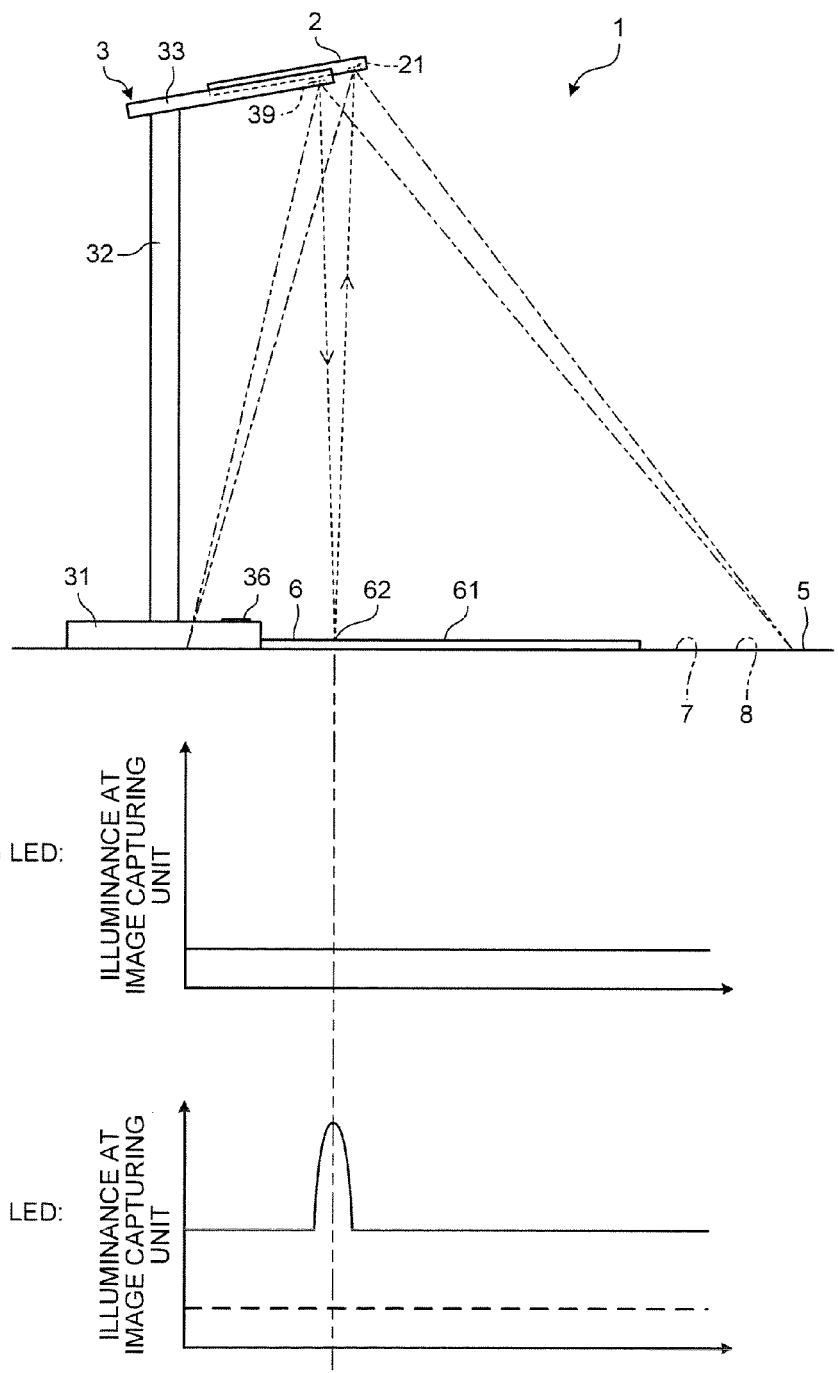
FIG. 8 is an explanatory diagram of illuminance at an image capturing unit with the lighting LED on and the same with the lighting LED off.

Next, the reason why the non-readable area 62 is generated due to specular reflection of light emitted from the lighting LED 39 on the surface of the medium 6 will be described. FIG. 8 is a schematic diagram which illustrates illuminance at the image capturing unit when the lighting LED is turned on and when the lighting LED is turned off. The smartphone 2 photographs the object by converting light incident to the image capturing unit 21 into an electric signal. Accordingly, when the smartphone 2 photographs the medium 6, the photographing process is performed by receiving light reflected on the surface of the medium 6. Here, generally, when light is emitted to the object, in many cases, diffuse reflection occurs and the image capturing unit 21 photographs the object such as the medium 6 by receiving light of the diffuse reflection as information of the object. However, in a case where the degree of smoothness of the surface of the medium 6 is high and the surface has a gloss, a part of the light which arrives at the medium 6 is specularly reflected on the surface of the medium 6.

In scanning the medium 6, in a case where the lighting LED 39 is turned on, the entirety of the photographed area 7 which includes the medium 6 is irradiated with the light emitted from the lighting LED 39, and accordingly, the amount of light emitted to the photographed area 7 is larger than the amount of light at the time when the lighting LED 39 is turned off. Accordingly, the amount of light, which travels toward the image capturing unit 21 after being diffuse-reflected on the object disposed in the photographed area 7, is large, and, therefore, the illuminance as a whole at the image capturing unit 21 is higher than that at the time when the lighting LED 39 is turned off.

In addition, at that time, in a case where the medium 6 which specularly reflects the light is installed to the photographed area 7, the light emitted from the lighting LED 39 is specularly reflected on the medium 6 as well. As above, when the light emitted from the lighting LED 39 is specularly reflected on the medium 6, based on the positional relation between the lighting LED 39 and the image capturing unit 21, in a case where the image capturing unit 21 is positioned on the optical path of light which is specularly reflected on the medium 6, the specularly-reflected light is incident to the image capturing unit 21.

At the image capturing unit, in case of receiving light from the photographed area 7, the specularly-reflected light, which is generated when the light emitted from the lighting LED 39 is specularly reflected on the medium 6, has the amount of the light much larger than that of light received from other part, i.e. a part where no specularly-reflected light is incident to the image capturing unit 21, of the photographed area 7. Accordingly, the illuminance at the image capturing unit 21, when the specularly-reflected light from the medium 6 is received, is much higher than the illuminance of the other part of the photographed area 7. Accordingly, the portion of the medium 6 where the light emitted from the lighting LED 39 is specularly reflected is the non-readable area 62 having illuminance too high for the image capturing unit to read the information of the medium 6.

Accordingly, in a case where surface of the medium 6 to be photographed is formed to have a high degree of smoothness and have a gloss on the surface thereof, due to positional relationship between the portion of the medium 6 where the light emitted from the lighting LED 39 is specularly reflected and the position of the image capturing unit 21, there are cases where the non-readable area 62 is generated in the image data 60. In the image capturing system 1 according to the first embodiment, in a case where non-readable area 62 is generated in the image data 60 during the turned-on state of the lighting LED 39, the image data 60 of the medium 6 is generated by photographing the medium 6 in a state where the lighting LED 39 is turned off so that the non-readable area 62 is not generated.

Figure 9:
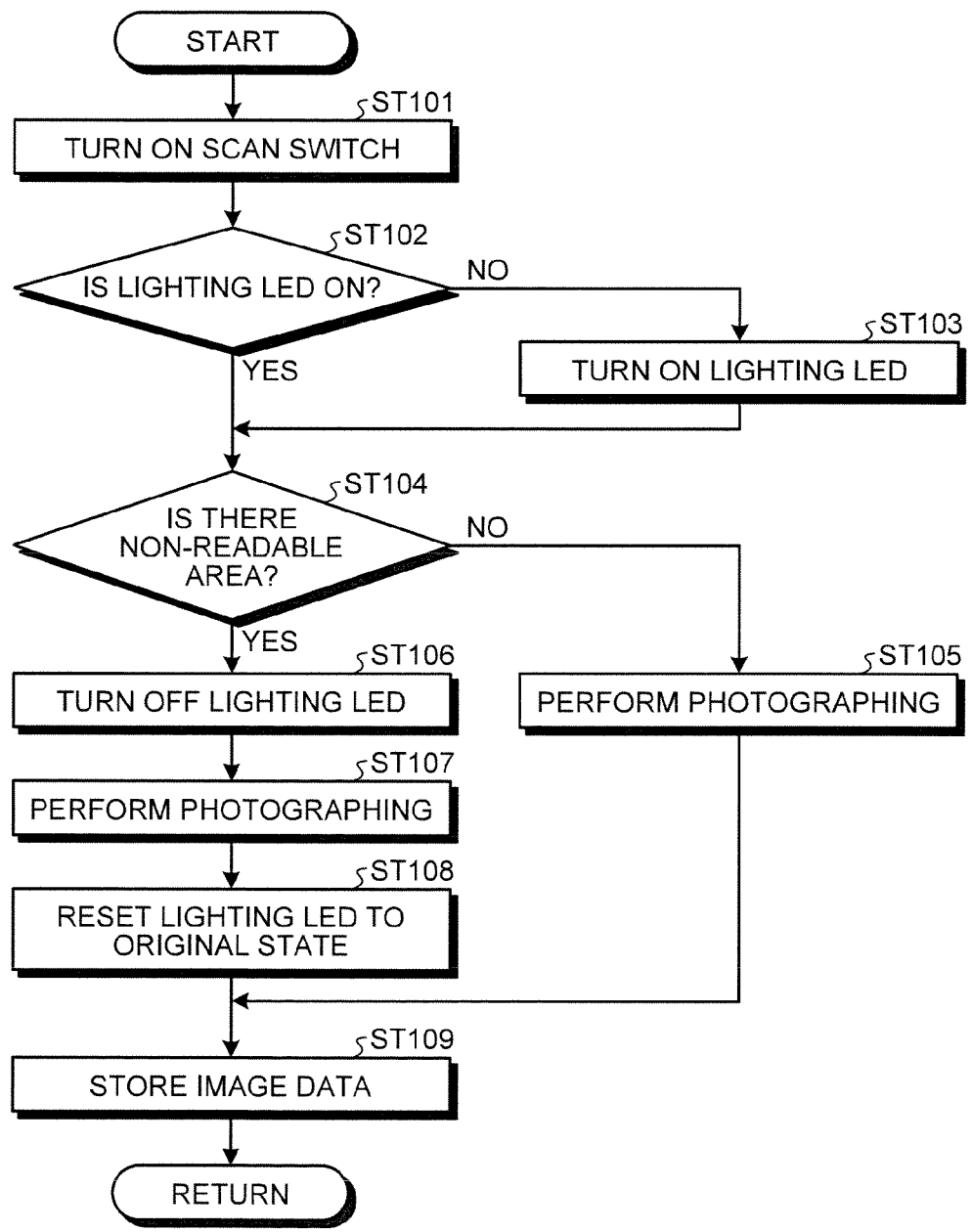
FIG. 9 is a flowchart of a control sequence for scanning a medium in the image capturing system illustrated in FIG. 1.

Next, the control sequence of the image capturing system 1 which scans the medium 6 by photographing the medium 6 with the lighting LED 39 turned off when the non-readable area 62 is generated as above will be described. FIG. 9 is a flowchart which illustrates a control sequence at the time of scanning a medium in the image capturing system illustrated in FIG. 1. When the medium 6 is scanned by the image capturing system 1, the scan switch 36 is turned on by depressing the scan switch 36 in the state in which the power switch 38 is turned on in Step ST101. The state of the scan switch 36 is acquired by the control unit 40. When the scan switch 36 is recognized to be turned on by the control unit 40, by performing communication between the communication unit 45 of the lighting device 3 and the communication unit 22 of the smartphone 2, the scan-start instruction is transmitted from the lighting device 3 to the smartphone 2. The smartphone 2 which has received the scan-start instruction starts the photographing process by operating the image capturing unit 21.

In addition, when the scan switch 36 is turned on, the lighting device 3 determines whether or not the lighting LED 39 is turned on in Step ST102. Since the turned-on/off state of the lighting LED 39 is controlled by the LED driver 41 of the control unit 40, the control unit 40 determines whether or not the lighting LED 39 is turned on based on the control state of the lighting LED 39 in the LED driver 41.

According to this determination, in a case where it is determined that the lighting LED 39 is not turned on (No in Step ST102), the lighting LED 39 is turned on in Step ST103. In other words, by controlling the lighting LED 39 using the LED driver 41 of the control unit 40, the lighting LED 39 which has been in the turned off state is turned on.

On the other hand, in a case where it is determined that the lighting LED 39 is turned on (Yes in Step ST102), it is determined whether or not there is the non-readable area 62 in Step ST104. In other words, it is determined whether there is the non-readable area 62 based on the image data 60 acquired by the smartphone 2 which has started the photographing process. The determination on whether there is the non-readable area 62 is made by the non-readable area determining unit 25 of the smartphone 2.

Figure 10:
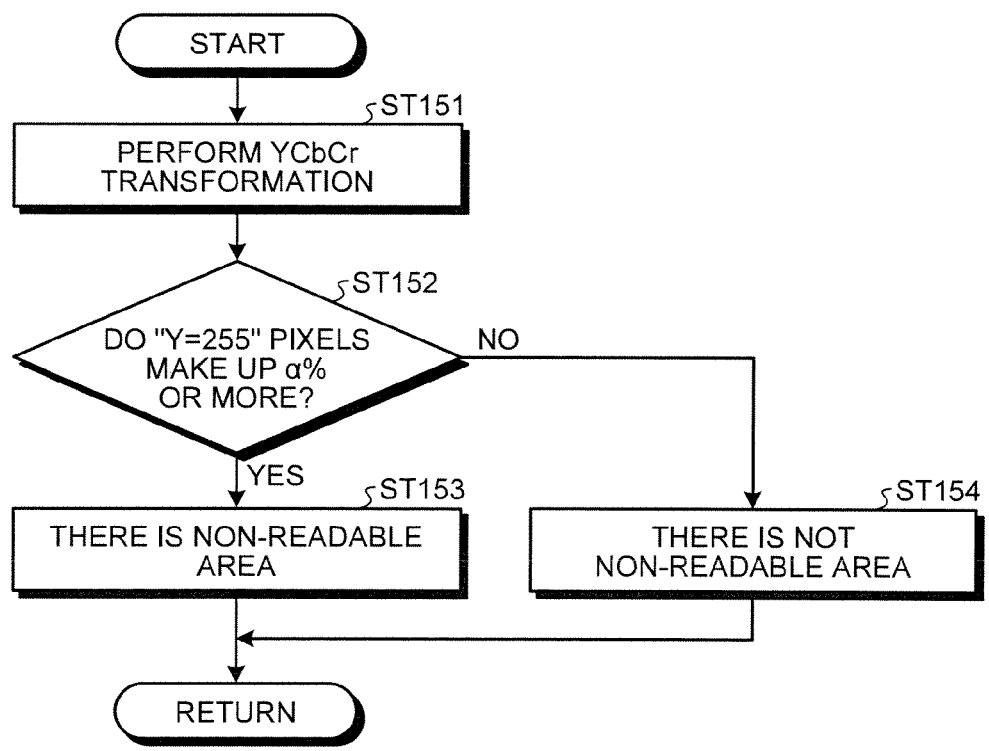
FIG. 10 is a flowchart of a procedure for determining whether or not there is a non-readable area.

FIG. 10 is a flowchart which illustrates the sequence at the time of determining whether or not there is a non-readable area. As an example of determining whether or not there is the non-readable area 62 at the non-readable area determining unit 25, the sequence of a case where the determination is made by performing YCbCr conversion of the image data 60 will be described. In a case where a determination on whether there is the non-readable area 62 is made, the image data 60, which is acquired by performing the photographing process using the image capturing unit 21, is converted into data in a YCbCr color space in which image information is represented by luminance and hue in Step ST151. In the YCbCr color space, an image-brightness component (Y) in the image data 60 is represented by numerical values of 0 to 255 where the numerical value is low when the brightness is low, and the numerical value is high when the brightness is high. Therefore, when the non-readable area 62 is generated, the image-brightness component (Y) becomes high in the non-readable area 62. Further, when converting the image data 60 into the data in the YCbCr color space, in order to increase speed of conversion process, the conversion process may be performed after lowering resolution of the image data 60.

After the image data 60 is converted into the data in the YCbCr color space, the non-readable area determining unit 25 determines whether or not there is an area in which quantity of pixels of Y=255 makes up α % or more within a predetermined pixel area in Step ST152. More specifically, the non-readable area determining unit 25 determines whether or not there is an area in which the quantity of pixels of Y=255 makes up α % or more within an arbitrary area of the image data 60, in the Y (luminance) component, a Cb (blue hue) component, and a Cr (red hue) component which are converted. The arbitrary area and a value "α" which functions as a threshold value, used in this determination are predetermined and stored in advance. The non-readable area determining unit 25 detects the value of Y of each pixel contained in the image data 60 and determines the quantity of the pixels of Y=255 makes up α % or more.

When photographing an object using the smartphone 2, since the object is generally photographed so that values of the Y (luminance) component fall within the range from 0 to 255, the values of the Y (luminance) component in the readable area 61 fall within the range from 0 to 255, thereby the smartphone 2 can read information from the medium 6. On the contrary, the non-readable area 62 is an area where the non-readable area determining unit 25 cannot read the information of the medium 6 because of a congregation of a large number of pixels having Y (luminance) components having values too high to obtain information of the object, when compared to other pixels in the same image. Accordingly, the non-readable area determining unit 25 determines existence or non-existence of the non-readable area 62 by determining whether or not the quantity of pixels of Y=255 makes up α % or more.

If it is determined that the quantity of pixels of Y=255 makes up α % or more (Yes in Step ST152), the non-readable area determining unit 25 determines that there is the non-readable area 62, or the non-readable area 62 exists (Step ST153). On the other hand, if it is determined that the quantity of pixels of Y=255 is less than α % (No in Step ST152), the non-readable area determining unit 25 determines that there is not the non-readable area 62, or the non-readable area 62 does not exist (Step ST154).

According to the determination made by the non-readable area determining unit 25, in a case where it is determined that there is no non-readable area 62 (No in Step ST104), the photographed area 7 is photographed by the smartphone 2 in the state in which the lighting LED 39 is turned on in Step ST105. Accordingly, the medium 6 which is installed to the photographed area 7 is read, and the image data 60 of the medium 6, which is in the state in which the non-readable area 62 is not generated, is read.

On the other hand, if it is determined that there is the non-readable area 62 (Yes in Step ST104), the lighting LED 39 is turned off, by controlling the lighting LED 39 using the LED driver 41 of the control unit 40 (Step ST106). Namely, an instruction for turning off the lighting LED 39 is transmitted from the smartphone 2 to the lighting device 3 through the communication unit 22 of the smartphone 2 and the communication unit 45 of the lighting device 3. The lighting device 3 turns off the lighting LED 39 based on this instruction.

When the lighting LED 39 is turned off, a turn-off completion signal is transmitted from the lighting device 3 to the smartphone 2, and smartphone 2 which has received this signal photographs the photographed area 7 with the lighting LED 39 turned off (Step ST107). Consequently, the smartphone 2 reads the image data 60 of the medium 6 in which the non-readable area 62 is not generated because the lighting LED 39 is turned off.

After photographing is completed, the lighting LED 39 is returned to its original state (Step ST108). In other words, when the image data 60 of the medium 6 has been read, the smartphone 2 transmits an image-reading completion signal to the lighting device 3. The lighting device 3 which has received this signal maintains the turned-off state in a case where the lighting LED 39 was turned off when the scanning was started and turns on the lighting LED 39 in a case where the lighting LED 39 was turned on when the scanning was started.

When the lighting LED 39 is returned to its original state, image data of the photographed image is stored in the recording unit 24 of the smartphone 2 (Step ST109). After it is determined that there is no non-readable area 62 (No in Step ST104), also in a case where an image of the medium 6 is obtained by photographing the photographed area 7 (Step ST105), this image is also stored in the recording unit 24 of the smartphone 2 (Step ST109). After the image data is stored, the process exits from one cycle of the control sequence.

The image capturing system 1 repeats the cycle of the control sequence while communicating with the smartphone 2 and the lighting device 3, thereby operating the smartphone 2 and the lighting device 3 in association with each other. Accordingly, the image capturing system 1 scans the medium 6 which is installed to the medium installation face 5 and stores a resultant image in the smartphone 2.

In a case where it is determined that there is the non-readable area 62 in the image acquired when the lighting LED 39 is turned on, after instructing scanning and before generating the image data 60, the image capturing system 1 according to the first embodiment performs photographing processes with the lighting LED 39 turned off, and in a case where it is determined that there is not the non-readable area 62 in the image acquired when the lighting LED 39 is turned on, the image capturing system 1 performs scanning with the lighting LED 39 turned on. Thus, in a case where the non-readable area 62 is not generated, a normal photographing process is performed, and a resultant image is stored. On the other hand, in a case where the non-readable area 62 is generated due to specular reflection on the medium 6, an image after eliminating the non-readable area 62 by turning off the lighting LED 39 can be stored. As a result, a high-quality image can be appropriately acquired.

As described above, the image capturing system 1 determines whether or not there is the non-readable area 62 with the lighting LED 39 turned on, and performs scanning switching over lighting state of the lighting LED 39, which enables to store the image after eliminating the non-readable area 62 even when a position of the non-readable area varies on the medium 6. For example, light is reflected differently from the medium 6 which is flat and the medium 6 which is curved, which results in different positions of the non-readable area, respectively, if the non-readable area 62 should be generated on each of the media 6. Even in such a situation, it becomes possible to obtain, from each of the media 6, an image that does not contain the non-readable area 62 by photographing the medium 6 making the lighting state of the lighting LED 39 differ and generating the image data 60 of the medium 6. Thus, a high-quality image can be obtained independently of the form of the medium 6.

Furthermore, after performing the scanning by photographing the medium 6 with the smartphone 2, the control unit 40 returns the lighting state of the lighting LED 39 to the lighting state before the scanning, and accordingly, the convenience at the time of using the image capturing system 1 as a lighting stand can be improved. As a result, while the convenience as a lighting stand is secured, a high-quality image can be acquired when the medium 6 is photographed.

Second Embodiment

While an image capturing system 1 according to a second embodiment has almost the same configuration as that of the image capturing system 1 according to the first embodiment, the image capturing system 1 has a feature such that when the lighting LED 39 is in the turned-off state at the time of instructing scanning operation, the scanning operation is performed maintaining the turned-off state of the lighting LED 39. Since the other configurations are the same as those of the first embodiment, the description thereof will not be presented, and the same reference numerals will be assigned thereto.

Similar to the image capturing system 1 according to the first embodiment, the image capturing system 1 according to the second embodiment is equipped with the smartphone 2 and the lighting device 3 which can mount the smartphone 2, and the lighting device 3 includes three members including the base unit 31, the arm unit 32, and the top unit 33. Also in the image capturing system 1 according to the second embodiment, on the lower face of the top unit 33 which faces the medium installation face 5, the lighting LED 39 which irradiates the medium installation face 5 is disposed.

In the image capturing system 1 according to the second embodiment as well, the smartphone 2 includes the image capturing unit 21, the communication unit 22, the image processing unit 23, the recording unit 24, the non-readable area determining unit 25, and the CPU 28. The lighting device 3 is equipped with a communication unit 45, the scan switch 36, the lighting switch 37, the power switch 38, and the control unit 40. The power switch 38 is connected to an AC adaptor which is connected to an external power source. The lighting LED 39 arranged on the top unit 33 of the lighting device 3 is electrically connected to the control unit 40, so that the control unit can turn on or turn off the lighting LED 39 by controlling power supply to the lighting LED 39 with the LED driver 41 of the control unit.

The image capturing system 1 according to the second embodiment is configured as described above. Hereinafter, operations of the image capturing system 1 according to the second embodiment are described. Similar to the lighting device 3 of the image capturing system 1 according to the first embodiment, the lighting device 3 of the image capturing system 1 according to the second embodiment can be used as the lighting stand. When the lighting device 3 is used as the lighting stand, by performing an input manipulation such as a depressing operation for the lighting switch 37 with the power switch 38 being in the On state, it is possible to turn on or turn off the lighting LED 39.

In the image capturing system 1, when performing scanning of the medium 6 placed on the medium installation face 5, the scanning operation is started by depressing the scan switch 36 in a state where the medium 6 is placed on the medium installation face 5. In this scanning operation, by performing communication between the smartphone 2 and the lighting device 3, and linked operation between the smartphone 2 and the lighting device 3, scanning operation of the medium 6 is performed.

In starting the scanning operation, first, the lighting state of the lighting LED 39 is checked. When the lighting LED 39 is in the turned-off state at the time the scan-start instruction is issued, the medium 6 is scanned maintaining the lighting LED 39 in the turned-off state.

On the other hand, if the lighting LED 39 is in the turned-on state when the scan-start instruction is issued, before generating the image data 60 to be stored, whether or not there is the non-readable area 62 is determined based on the image of the medium 6 obtained by photographing the medium 6 with the lighting LED 39 in the turned-on state. If it is determined that there is not the non-readable area 62 with the lighting LED 39 in the turned-on state, the medium 6 in the photographed area 7 is photographed with the lighting LED 39 in the turned-on state, and the image data 60 is stored in the recording unit 24 of the smartphone 2. Consequently, the image capturing system 1 performs scanning of the medium 6 by photographing the medium 6 and storing the image data 60 in an optimal environment created by the lighting LED 39.

On the other hand, if it is determined that there is the non-readable area 62 with the lighting LED 39 in the turned-on state, the lighting LED 39 is turned off, and thereafter the medium 6 is photographed. Consequently, the image capturing system 1 photographs the medium 6 where the non-readable area 62 is not generated and stores the image data 60, thereby scanning of the medium 6 is performed.

Figure 11:
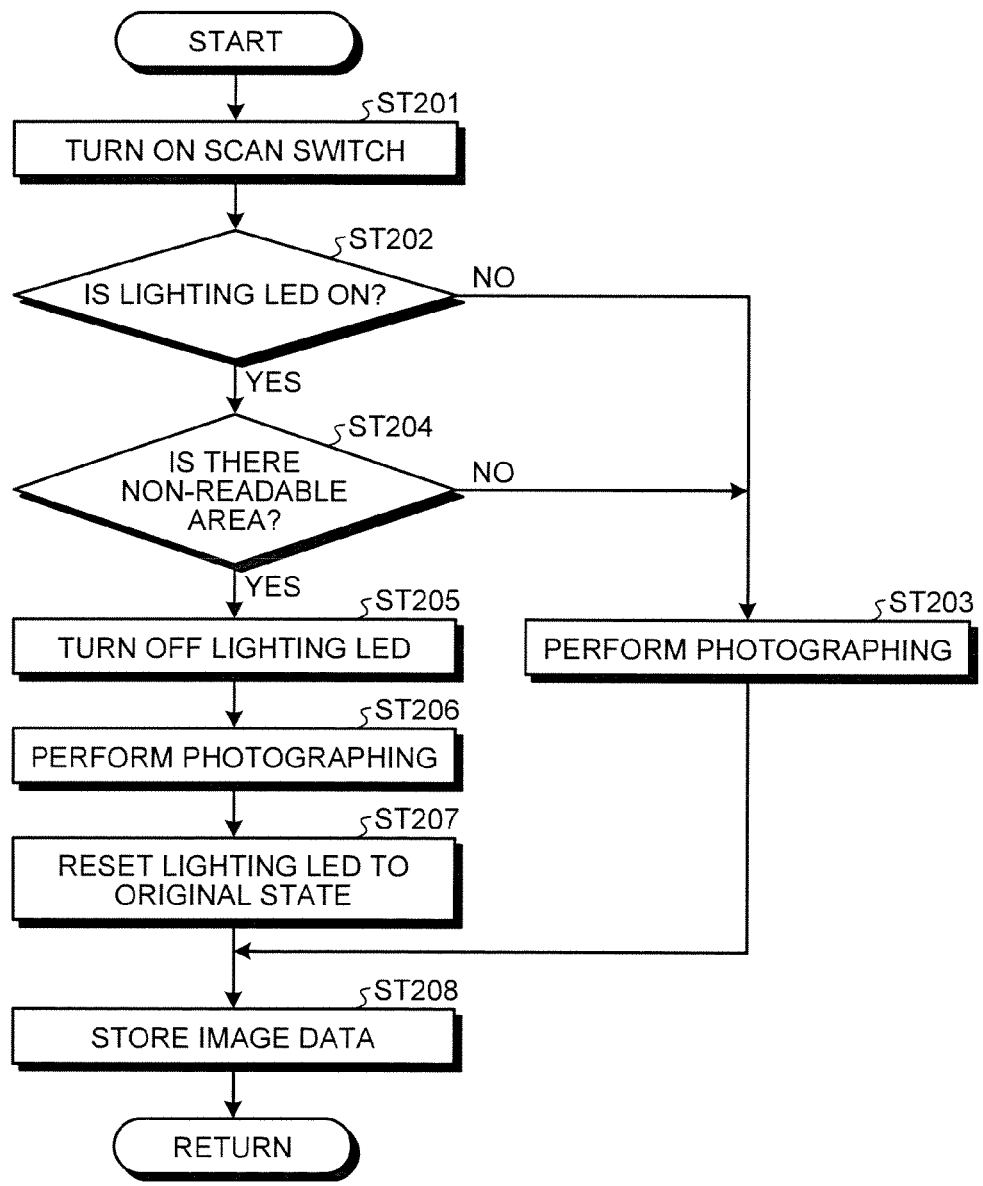
FIG. 11 is a flowchart of a control sequence for scanning a medium in the image capturing system according to a second embodiment of the present invention.

Next, a control sequence performed by the image capturing system 1, where the image capturing system 1 performs scanning maintaining the lighting LED 39 in the turned-off state when an instruction to perform scanning is issued in the turned-off state of the lighting LED 39, is explained below. FIG. 11 is a flowchart of the control sequence for scanning a medium in the image capturing system 1 according to the second embodiment. When scanning the medium 6 using the image capturing system 1, the scan switch 36 is turned on by depressing the scan switch 36 when the power switch 38 is on (Step ST201). When the control unit 40 detects that the scan switch 36 is turned on, start of the scanning is instructed from the lighting device 3 to the smartphone 2 by performing communication between the communication unit 45 of the lighting device 3 and the communication unit 22 of the smartphone 2. Upon receiving the scan-start instruction, the smartphone 2 activates the image capturing unit 21 and starts photographing.

When the scan switch 36 is turned on, in the lighting device 3, whether or not the lighting LED 39 is on is determined based on a control state of the lighting LED 39 by the LED driver 41 (Step ST202). If it is determined that the lighting LED 39 is not on (No in Step ST202), the smartphone 2 photographs the photographed area 7 with the lighting LED 39 in the turned-off state (Step ST203). Consequently, the smartphone 2 reads the medium 6 placed in the photographed area 7 maintaining the lighting LED 39 in the turned-off state and generates the image data 60 of the medium 6 in a state where the non-readable area 62 is not generated.

On the other hand, when it is determined that the lighting LED 39 is on (Yes in Step ST202), whether or not there is the non-readable area 62 is determined (Step ST204). More specifically, the non-readable area determining unit 25 determines whether or not there is the non-readable area 62 based on the image data 60 obtained by the smartphone 2 that has started photographing.

If it is determined that there is not the non-readable area 62 (No in Step ST204), the smartphone 2 photographs the photographed area 7 with the lighting LED 39 in the turned-on state (Step ST203). Consequently, the smartphone 2 generates the image data 60 of the medium 6, which is illuminated with illuminating light from the lighting LED 39 and on which the non-readable area 62 is not generated.

On the other hand, when it is determined that there is the non-readable area 62 (Yes in Step ST204), the smartphone 2 turns off the lighting LED 39 (Step ST205), and photographs the photographed area 7 with the lighting LED 39 in the turned-off state (Step ST206). Consequently, the smartphone 2 generates the image data 60 of the medium 6 where the non-readable area 62 is not generated because the lighting LED 39 is off.

After the photographing is performed, the lighting state of the lighting LED 39 is reset to its original state which is pre-scan state (Step ST207). After the lighting LED 39 is reset to its original state, the image data 60 of the photographed image is stored in the recording unit 24 of the smartphone 2 (Step ST208). When it is determined that the lighting LED 39 is not on (No in Step ST202) and thereafter the image data 60 of the medium 6 is obtained by photographing the photographed area 7 with the lighting LED 39 in the turned-off state (Step ST203), the image data 60 is also stored in the recording unit 24 of the smartphone 2 (Step ST208). When it is determined that there is not the non-readable area 62 (No in Step ST204) and thereafter the image data 60 of the medium 6 is obtained by photographing the photographed area 7 (Step ST203), the image data 60 is also stored in the recording unit 24 of the smartphone 2 (Step ST208). After the image data 60 is stored, control exits from this one cycle of the control sequence.

In the image capturing system 1, the smartphone 2 and the lighting device 3 perform linked operation by repeating the cycles of these control sequences while carrying out communication between the smartphone 2 and the lighting device 3. By operating in such a manner, the image capturing system 1 scans the medium 6 placed on the medium installation face 5 and stores the image data 60 in the smartphone 2.

The image capturing system 1 according to the second embodiment performs the scanning maintaining the turned-off state of the lighting LED 39, when the lighting LED 39 is in the turned-off state at the time the instruction to perform the scanning is issued. Accordingly, the image capturing system 1 can perform the scanning to meet a user's intention to perform the scanning with the lighting LED 39 turned off. As a result, the image capturing system 1 can meet the user's intention and suitably obtain a high-quality image.

Third Embodiment

While an image capturing system 1 according to a third embodiment has almost the same configuration as that of the image capturing system 1 according to the second embodiment, the image capturing system 1 has a feature such that when it is determined that there is not the non-readable region 62 at the time the lighting LED 39 is turned on, the scanning operation is performed maximizing amount of light of the lighting LED 39. Since the other configurations are the same as those of the second embodiment, the description thereof will not be presented, and the same reference numerals will be assigned thereto.

Similar to the image capturing system 1 according to the second embodiment, the image capturing system 1 according to the third embodiment includes the smartphone 2 and the lighting device 3, on which the smartphone 2 can be placed. The lighting device 3 includes the lighting LED 39 that illuminates the medium installation face 5. The smartphone 2, which is a constituent of the image capturing system 1, includes the image capturing unit 21, the communication unit 22, the image processing unit 23, the recording unit 24, the non-readable area determining unit 25, and the CPU 28. The lighting device 3 is equipped with a communication unit 45, the scan switch 36, the lighting switch 37, the power switch 38, and the control unit 40. The power switch 38 is connected to an AC adaptor which is connected to an external power source.

In the image capturing system 1 according to the third embodiment, the control unit 40 includes a MPU 42 and the LED driver 41, and the MPU 42 performs driving control for adjusting the amount of light of the lighting LED 39 through the LED driver 41. The light control unit 40, adjusting the amount of light of the lighting LED 39, adjusts the amount of light through pulse width modulation (PWM) control.

More specifically, the control unit 40 is configured to be capable of changing the amount of light of the lighting LED 39 by changing the ratio between the On and Off states of a switch (not illustrated) in a power supply circuit for supplying electric power to the lighting LED 39 in a period of a predetermined frequency. In other words, by changing a duty ratio which is a ratio of a time during which the switch is closed to one period, the amount of light of the lighting LED 39 is changed.

For example, in a case where a current to the lighting LED 39 is continuously shut off by continuously opening the switch in one period, the duty ratio is 0%. On the other hand, in a case where a current continuously flows through the lighting LED 39 by continuously closing the switch in one period, the duty ratio is 100%. As described above, in the PWM control process, by changing the opening/closing time of the switch in one period, the duty ratio is changed, whereby a time during which the current flows through the lighting LED 39 in one period is changed. Accordingly, the light emission time of the lighting LED 39 in one period is changed in accordance with the duty ratio.

Meanwhile, electric power supplied from the external power source via the AC adapter 50 is input to an electrical circuit with a constant voltage regardless of elapse of time. In a case where the PWM control process is performed, the PWM output is made only for a time corresponding to the duty ratio for an elapse of time in each period of the PWM control process to an input from the external power source. Accordingly, the light emission time of the lighting LED 39 per unit time is changed in accordance with the duty ratio, and therefore, the amount of light per unit time is changed. The image capturing system 1 according to the third embodiment performs driving control for adjusting the amount of light of the lighting LED 39 through PWM control in this manner.

The image capturing system 1 according to the third embodiment is configured as described above. Hereinafter, operations of the image capturing system 1 according to the third embodiment are described. Similar to the lighting device 3 of the image capturing system 1 according to the second embodiment, the lighting device 3 constituting the image capturing system 1 according to the third embodiment can be used as the lighting stand. In the image capturing system 1, when performing scanning of the medium 6 placed on the medium installation face 5, the scanning operation is started by depressing the scan switch 36 in a state where the medium 6 is placed on the medium installation face 5.

When scanning is started, as in the image capturing system 1 according to the second embodiment, the lighting state of the lighting LED 39 is checked. When the lighting LED 39 is in the turned-off state, the medium 6 is scanned with the lighting LED 39 maintained in the turned-off state. When the lighting LED 39 is in the turned-on state, whether or not there is the non-readable area 62 is determined.

When it is determined that there is not the non-readable area 62 with the lighting LED 39 in the turned-on state, a duty ratio of the PWM control for the lighting LED 39 is set to 100%, and scanning is performed with the lighting LED 39 lit at its maximum amount of light. Thus, when it is determined that there is not the non-readable area 62, the image capturing system 1 scans the medium 6 in an optimal environment created by the lighting LED 39 such that the medium 6 in the photographed area 7 is photographed with the lighting LED 39 lit at its maximum amount of light, and the image data 60 is stored in the recording unit 24 of the smartphone 2.

On the other hand, when it is determined that there is the non-readable area 62 in the turned-on state of the lighting LED 39, the medium 6 is photographed after the lighting LED 39 is turned off. Consequently, scanning of the medium 6 is performed such that the image capturing system 1 photographs the medium 6 where the non-readable area 62 is not generated and stores the image data 60.

Figure 12:
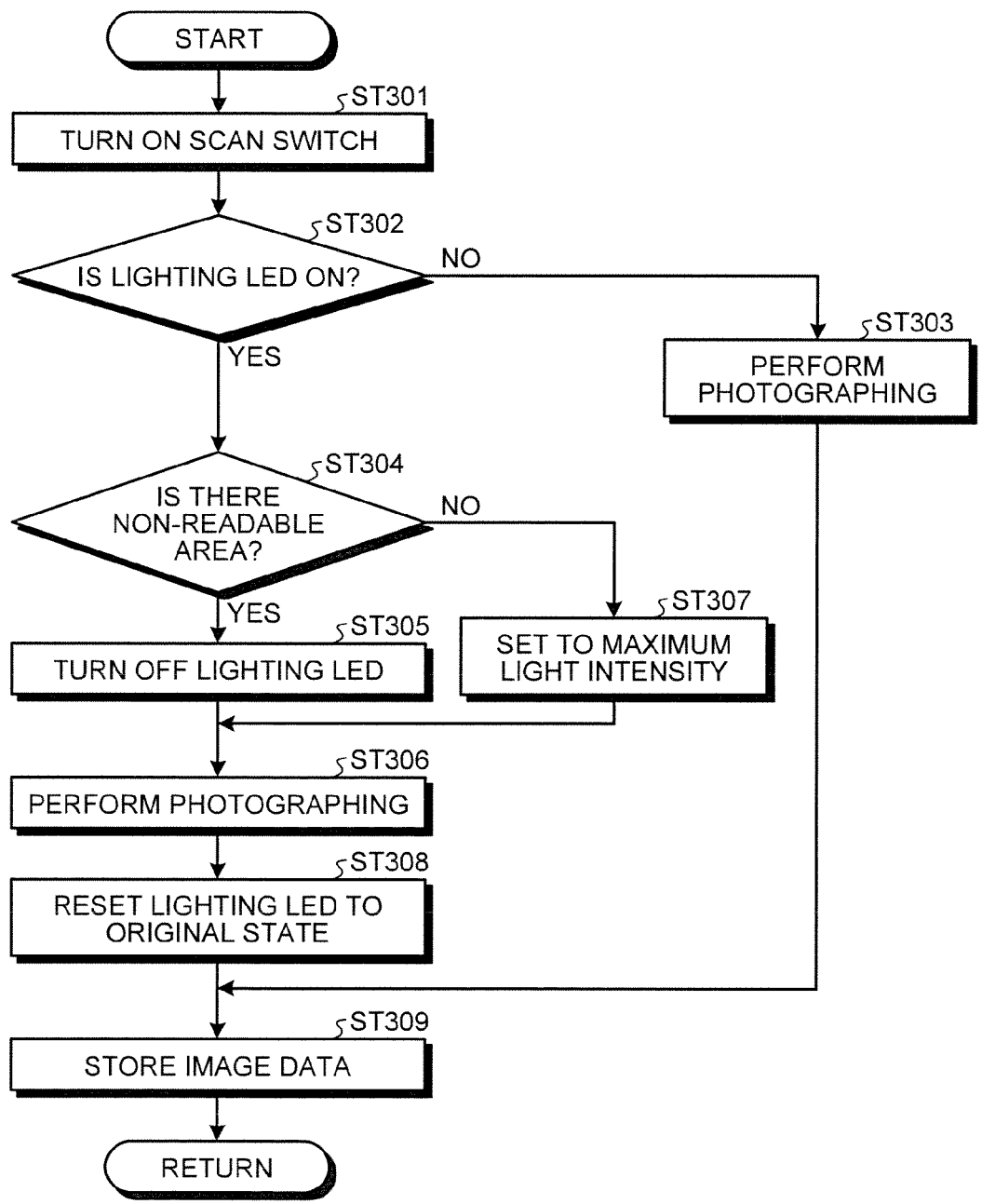
FIG. 12 is a flowchart of a control sequence for scanning a medium in the image capturing system according to a third embodiment of the present invention.

Next, a control sequence of the image capturing system 1 that performs scanning with the lighting LED 39 lit at its maximum amount of light when it is determined that there is not the non-readable area 62 is explained. FIG. 12 is a flowchart of the control sequence for scanning a medium in the image capturing system 1 according to the third embodiment. When performing the scanning of the medium 6 by the image capturing system 1, the scan switch 36 is turned on by pressing the scan switch 36 when the power switch 38 is on (Step ST301). When the control unit 40 detects that the scan switch 36 is turned on, a scan-start instruction is issued from the lighting device 3 to the smartphone 2 by performing communication between the communication unit 45 of the lighting device 3 and the communication unit 22 of the smartphone 2. Upon receiving the scan-start instruction, the smartphone 2 activates the image capturing unit 21 and starts photographing.

When the scan switch 36 is turned on, in the lighting device 3, whether or not the lighting LED 39 is on is determined based on a control state of the lighting LED 39 by the LED driver 41 (Step ST302). When it is determined that the lighting LED 39 is not on (No in Step ST302), the smartphone 2 photographs the photographed area 7 with the lighting LED 39 in the turned-off state (Step ST303). Consequently, the smartphone 2 obtains the image data 60 representing the medium 6 where the non-readable area 62 is not generated.

On the other hand, when it is determined that the lighting LED 39 is on (Yes in Step ST302), the non-readable area determining unit 25 determines whether or not there is the non-readable area 62 based on the image data 60 obtained by the smartphone 2 that has started photographing (Step ST304).

When it is determined that there is the non-readable area 62 (Yes in Step ST304), the lighting LED 39 is turned off (Step ST305). The smartphone 2 photographs the photographed area 7 with the lighting LED 39 in the turned-off state (Step ST306). Consequently, the smartphone 2 obtains the image data 60 of the medium 6 where the non-readable area 62 is not generated because the lighting LED 39 is off.

When it is determined that there is not the non-readable area 62 (No in Step ST304), the amount of light of the lighting LED 39 is set to its maximum amount of light (Step ST307). More specifically, the smartphone 2 transmits an instruction signal, which instructs that the amount of light of the lighting LED 39 be maximized, to the lighting device 3 via wireless communication between the communication unit 22 of the smartphone 2 and the communication unit 45 of the lighting device 3. The lighting device 3, upon receiving this instruction signal, performs driving control of the lighting LED 39 by setting the duty ratio of the PWM control to 100% using the LED driver 41. Consequently, the lighting LED 39 is lit at its maximum amount of light.

After the lighting LED 39 is lit at its maximum amount of light, the smartphone 2 photographs the photographed area 7 illuminated with the maximum amount of light (Step ST306). Consequently, the smartphone 2 obtains the image data 60 of the medium 6, on which the non-readable area 62 is not generated and which is illuminated with light of the maximum quantity emitted from the lighting LED 39.

After the photographing is performed as described above, the lighting state of the lighting LED 39 is reset to its original state, at which the determination as to whether or not there is the non-readable area 62 has been made in Step ST304 (Step ST308). More specifically, when the lighting LED 39 has been turned off in Step ST305, the lighting LED 39 is lit with previous amount of light which is the amount of light before the lighting LED 39 is turned off. When the amount of light of the lighting LED 39 has been adjusted to its maximum amount of light (Step ST307), the amount of light of the lighting LED 39 is reset to its prior amount of light which is the amount of light before adjustment of the amount of light of the lighting LED 39 is performed.

After the lighting LED 39 is reset to its original state, image data 60 of the photographed image is stored in the recording unit 24 of the smartphone 2 (Step ST309). When it is determined that the lighting LED 39 is not on (No in Step ST302) and thereafter the image of the medium 6 is obtained by photographing the photographed area 7 with the lighting LED 39 in the turned-off state (Step ST303), the image data 60 of this image is also stored in the recording unit 24 of the smartphone 2 (Step ST309). After the image data 60 is stored, control exits from this one cycle of the control sequence.

In the image capturing system 1, the smartphone 2 and the lighting device 3 perform linked operation by repeating the cycles of these control sequences while carrying out communication between the smartphone 2 and the lighting device 3. By operating in such a manner, the image capturing system 1 scans the medium 6 placed on the medium installation face 5 and stores the image data 60 in the smartphone 2.

The image capturing system 1 according to the third embodiment performs scanning by setting the duty ratio of the PWM control for the turned-on state of the lighting LED 39 to 100%, when it is determined that there is not the non-readable area 62. Accordingly, when there is not the non-readable area 62, the scanning can be performed in a more appropriate photographing condition. As a result, a high-quality image can be suitably obtained more reliably.

Modifications

Figure 13:
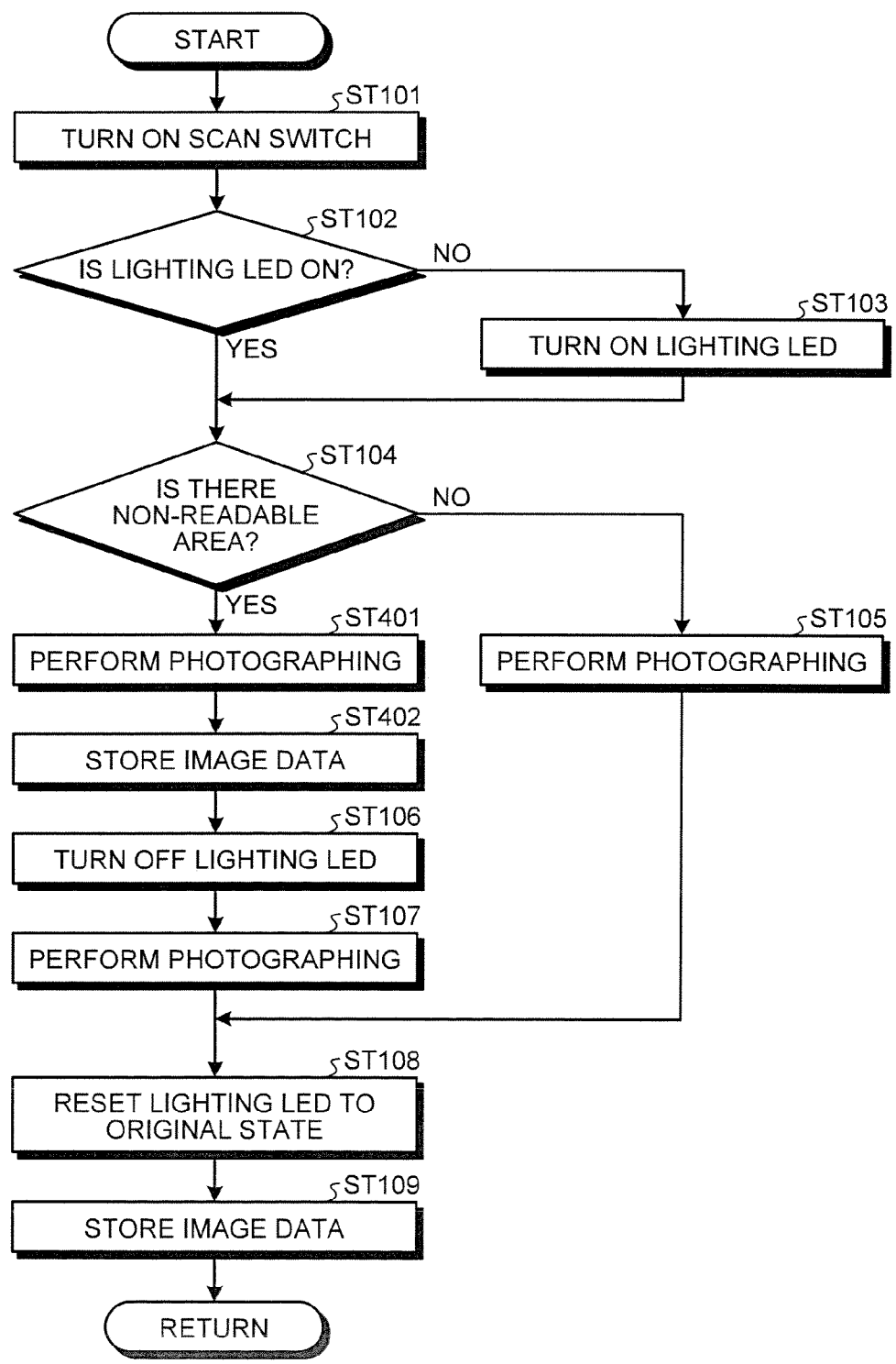
FIG. 13 is a flowchart of a control sequence for performing photographing a plurality of times in a modification of the image capturing system according to the first embodiment of the present invention.

In the image capturing system 1 described above, the image capturing system 1 performs photographing to generate the image data 60 to be stored in the scanning operation only once per scan. Alternatively, photographing may be performed a plurality of times per scan. FIG. 13 is a flowchart of a control sequence for performing photographing a plurality of times in a modification of the image capturing system according to the first embodiment. As a procedure for performing photographing a plurality of times per scan, as shown in FIG. 13, when the non-readable area determining unit 25 determines that there is the non-readable area 62 with the lighting LED 39 in the turned-on state (Yes in Step ST104), the smartphone 2 photographs the photographed area 7 with the lighting LED 39 in the turned-on state (Step ST401). Consequently, the smartphone 2 obtains the image data 60 of the medium 6 on which the non-readable area 62 is generated by specular reflection of light emitted from the lighting LED 39.

After photographing the medium 6 where the non-readable area 62 is generated, the image data 60 obtained by photographing the medium 6 is stored in the recording unit 24 of the smartphone 2 (Step ST402). Thereafter, the lighting LED 39 is turned off (Step ST106). The smartphone 2 photographs the medium 6 where the non-readable area 62 is not generated (Step ST107). After the lighting state of the lighting LED 39 is reset to original state which is a state when the scanning is started (Step ST108), the image data 60 obtained by photographing the medium 6 where the non-readable area 62 is not generated is stored in the recording unit 24 of the smartphone 2 (Step ST109).

When photographing is performed a plurality of times per scan, when the non-readable area determining unit 25 determines that there is the non-readable area 62, by performing the scanning both in the turned-on state and in the turned-off state of the lighting LED 39, both the image data 60 of the turned-on state and the image data 60 of the turned-off state may be stored. This allows, in a situation where the non-readable area 62 is generated, a user to obtain both images with the lighting LED 39 in the turned-on state and images with the lighting LED 39 in the turned-off state. Accordingly, the user can use a selected one of the images of the medium 6. As a result, in a situation where the non-readable area 62 is generated, a user can suitably obtain an image preferred by the user.

In the image capturing system 1 described above, when the non-readable area 62 is generated by light emitted from the lighting LED 39, the lighting LED 39 is turned off, thereby performing photographing in a state where the non-readable area 62 is not generated. However, when the non-readable area 62 is generated, the image capturing system 1 may be modified so as to notice the user that the non-readable area 62 is generated so that the user can confirm a state of lighting set during photographing.

Figure 14:
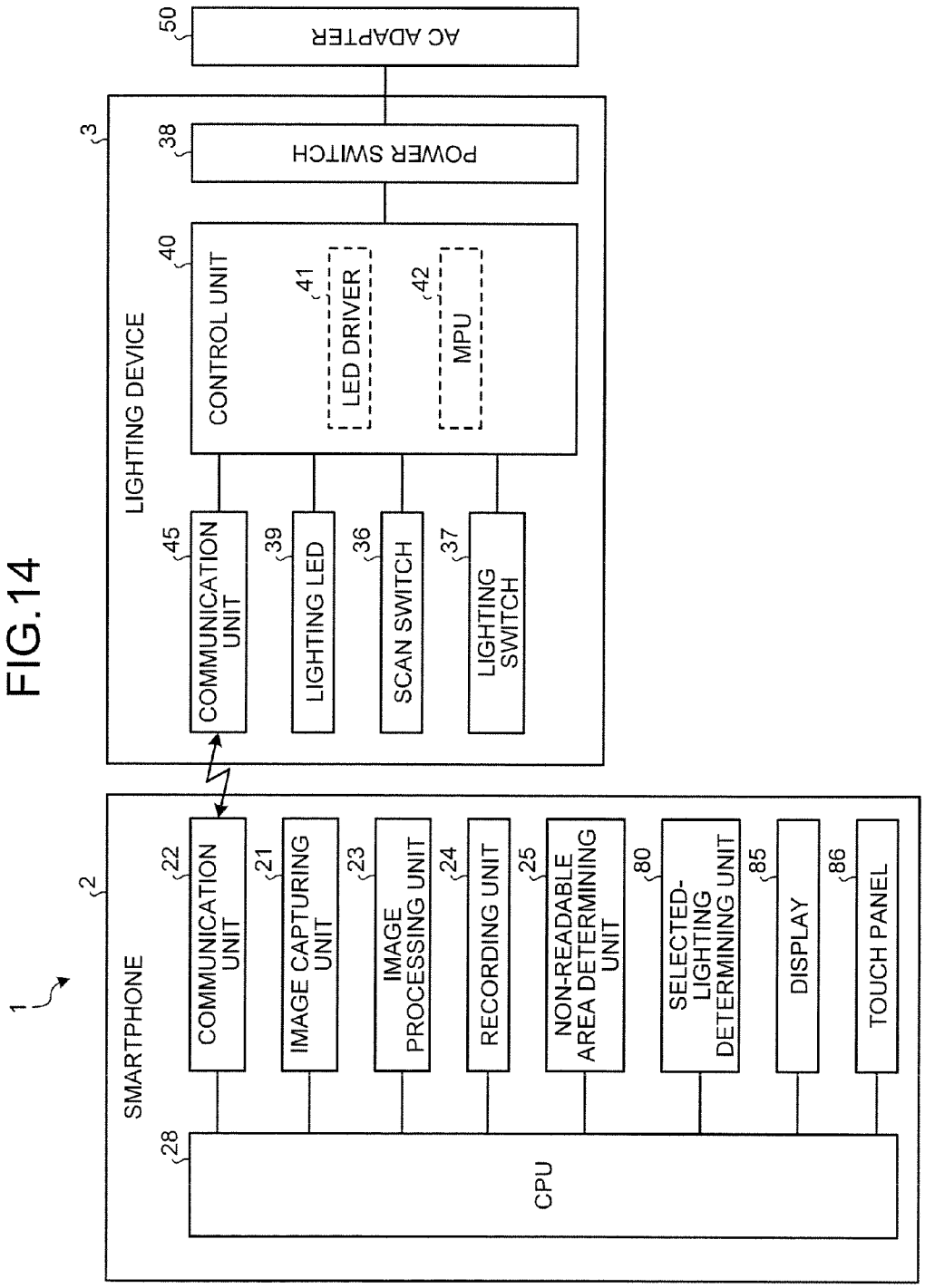
FIG. 14 is a functional block diagram of a modification, which includes a notifying unit, of the image capturing system according to the first embodiment of the present invention.

FIG. 14 is a functional block diagram of a modification of the image capturing system according to the first embodiment, where the modification includes a notifying unit. As the notifying unit, which notifies a user that there is the non-readable area 62 on a photographed image of the medium 6 obtained by the smartphone 2, a display 85 provided in the smartphone 2 may be used. The display 85 is connected to the CPU 28 and capable of displaying a notification, based on a signal fed from the CPU 28, that there is the non-readable area 62 when the non-readable area determining unit 25 determines that there is the non-readable area 62 in the image data 60.

The smartphone 2 includes a lighting-choice determining unit 80 as a unit to confirm user's choice of lighting state when performing the photographing, when the notification that there is the non-readable area 62 is notified to the user. The lighting-choice determining unit 80 is configured to be capable of determining, after the notification that there is the non-readable area 62 is notified, the user's choice whether the lighting LED 39 is turned off or not when performing the photographing, based on an input entered by the user from a touch panel 86 on the display 85. The lighting-choice determining unit 80 and the touch panel 86 are connected to the CPU 28 and configured to be capable of communicating an input signal, which derives from user input to the touch panel 86, and information about user's choice about the lighting LED 39 with the CPU 28.

Figure 15:
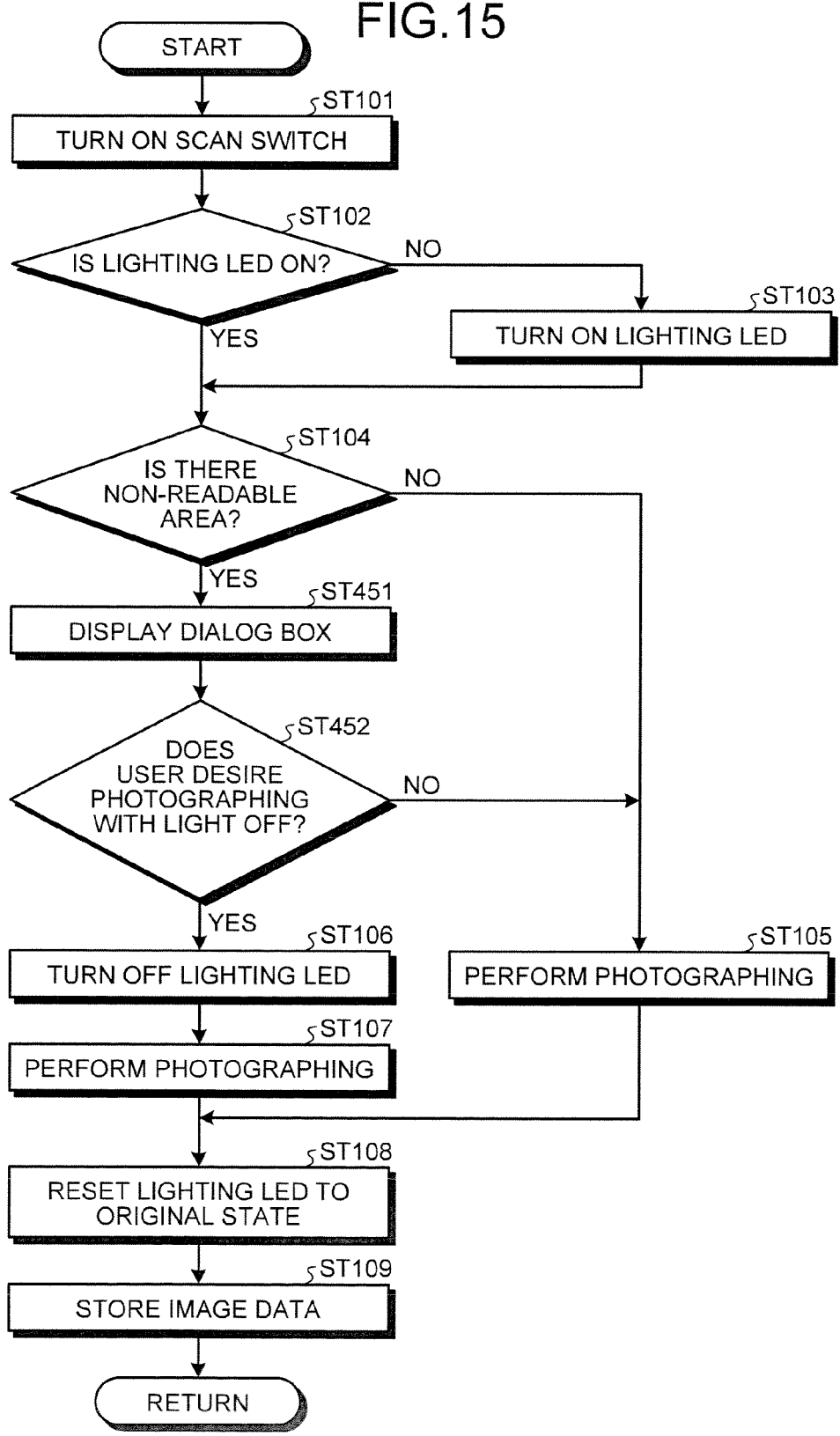
FIG. 15 is a flowchart of a control sequence for delivering a notification that a non-readable area is generated in a modification of the image capturing system according to the first embodiment of the present invention.

FIG. 15 is a flowchart of a control sequence for notifying that a non-readable area is generated in a modification of the image capturing system according to the first embodiment. As a procedure to notify, when the non-readable area 62 is generated, that the non-readable area 62 is generated, as shown in FIG. 15, when the non-readable area determining unit 25 determines that there is the non-readable area 62 with the lighting LED 39 in the turned-on state (Yes in Step ST104), a dialog box is displayed (Step ST451). More specifically, a notification is delivered to a user by displaying a dialog box on the display 85 and indicating, in the dialog box, that the non-readable area 62 is generated on an image photographed by the image capturing unit 21 with the lighting LED 39 in the turned-on state.

In this dialog box, not only the notification that the non-readable area 62 is generated but also a dialog confirming the user's choice whether or not to perform photographing with the lighting LED 39 off are displayed. The smartphone 2, which has displayed the dialog to confirm the user's choice whether or not to perform photographing with the lighting LED 39 off, enters a state waiting for user's selection. The selection as to whether or not to turn off the lighting LED 39 is entered by operating the touch panel 86 on the display 85.

In a state where the dialog is displayed in the dialog box on the display 85, when the user enters an input from the touch panel 86, whether or not the user selects photographing with light off, that is, whether or not the user intends photographing with light off is determined (Step ST452). The determination is made by the lighting-choice determining unit 80 of the smartphone 2 based on information about the input entered from the touch panel 86. More specifically, the lighting-choice determining unit 80 determines whether or not photographing with the lighting LED 39 off is selected based on the information about the input entered from the touch panel 86.

If the lighting-choice determining unit 80 determines that the user desires photographing with the lighting LED 39 turned off (Yes in Step ST452), the lighting LED 39 is turned off (Step ST106). The smartphone 2 photographs the medium 6 where the non-readable area 62 is not generated (Step ST107).

On the other hand, when the lighting-choice determining unit 80 determines that the user does not intend to perform photographing with the lighting LED 39 turned off (No in Step ST452), the lighting LED 39 is turned on. The smartphone 2 photographs the photographed area 7 where the non-readable area 62 is generated by specular reflection of light emitted from the lighting LED 39 (Step ST105). After the lighting state of the lighting LED 39 is reset to its original state which is pre-scan state (Step ST108), the image data 60 obtained by photographing with the lighting LED 39 in the turned-off state or the image data 60 obtained by photographing with the lighting LED 39 in the turned-on state is stored in the recording unit 24 of the smartphone 2 (Step ST109). After the lighting state of the lighting LED 39 is reset to its previous state which is a state when the scanning is started (Step ST108), the image data 60 obtained by photographing the medium 6 with the lighting LED 39 in the turned-off state, or image data 60 obtained by photographing the medium 6 with the lighting LED 39 in the turned-on state is stored in the recording unit 24 of the smartphone 2 (Step ST109).

As described above, when the non-readable area determining unit 25 determines that there is the non-readable area 62, the notification unit notifies that there is the non-readable area 62 in an image of the medium 6 obtained by photographing with the lighting LED 39 in the turned-on state using the display 85. Accordingly, in a situation where the non-readable area 62 is generated when performing photographing, a user can select a lighting state of the lighting LED 39.

In this modification, for example, even when there is the non-readable area 62 in the image data 60, and if a portion at which the non-readable area 62 is generated is a portion which includes information unnecessary for the user, by performing photographing with the lighting LED 39 in the turned-on state, information contained in portion other than the non-readable area 62 can be obtained with a sharp image quality.

Meanwhile, the non-readable area 62 is not always generated on the medium 6. For instance, in a case where the medium installation face 5 is glossy, the non-readable area 62 can be generated on the medium installation face 5. Even in such a case, the modification allows obtaining a sharp-quality image by photographing the medium 6 with the lighting LED 39 maintained in the turned-on state.

The notifying unit that notifies a user that there is the non-readable area 62 on an image of the medium 6 obtained by photographing by the smartphone 2 is not limited to the display 85. For example, a loudspeaker provided in the smartphone 2 may be used as the notifying unit. In this case, a notification that there is the non-readable area 62 can be notified as voice or alarm sound from the loudspeaker.

The notifying unit may be arranged on the lighting device 3. In this case, when the non-readable area determining unit 25 of the smartphone 2 determines that there is the non-readable area 62, a signal indicative thereof is transmitted from the smartphone 2 to the lighting device 3 by wireless communication, so that a notification is delivered or notified by the notifying unit of the lighting device 3. The lighting-choice determining unit 80 may be arranged on the lighting device 3 as well. Because the smartphone 2 and the lighting device 3 can transmit information to each other by wireless communication, it is preferred that the notifying unit and the lighting-choice determining unit 80 are arranged for convenience of a user depending on how the image capturing system 1 is used.

In the image capturing system 1 described above, the determination as to whether or not there is the non-readable area 62 is made by transforming the image data 60 obtained by the smartphone 2 into the YCbCr color space (format) and determining whether or not the quantity of pixels of Y=255 makes up $\alpha$ % or more of pixels in the image data 60. Alternatively, the determination may be made by another method. For instance, the determination as to whether or not there is the non-readable area 62 may be made based on a size of a region of pixels of Y=255.

Specifically, with respect to the image data 60 obtained by photographing with the lighting LED 39 in the turned-on state, the image data 60 is binarized and goes through a labelling process by using the luminance value Y=255 as a threshold value, thereby isolating regions each of which is made up of a plurality of "luminance Y=255" pixels. After the labeling process, a label (labelled region) made up of a predetermined number of pixels or more is determined as the non-readable area 62. When there is any region determined as the non-readable area 62 in the image data 60, it is determined that the non-readable area 62 is generated. By making the determination as to whether or not there is the non-readable area 62 based on a size of a region made up of a plurality of "luminance Y=255" pixels in this manner, the determination as to whether or not the non-readable area 62 is generated by light emitted from the lighting LED 39 can be made more accurately.

Further alternatively, the determination as to whether or not there is the non-readable area 62 may be made by a method other than methods based on "luminance Y=255" pixels. For instance, there can be a situation where, rather than apparent specular reflection of light emitted from the lighting LED 39, uneven distribution of light amount occurs in such a manner that only a portion near an optical axis of the lighting LED 39 on the medium 6 is dimly bright with higher luminance. In this case, values of the luminance Y in this portion do not become 255. Accordingly, in a situation where such uneven distribution of light amount can occur, a parameter other than the luminance Y may preferably be used to determine whether or not there is the non-readable area 62. For instance, there may be employed a method of extracting an image obtained with only illuminating light emitted from the lighting LED 39, and determining whether or not there is the non-readable area 62 based on this image of only the illuminating light from the lighting LED 39.

Figure 16:
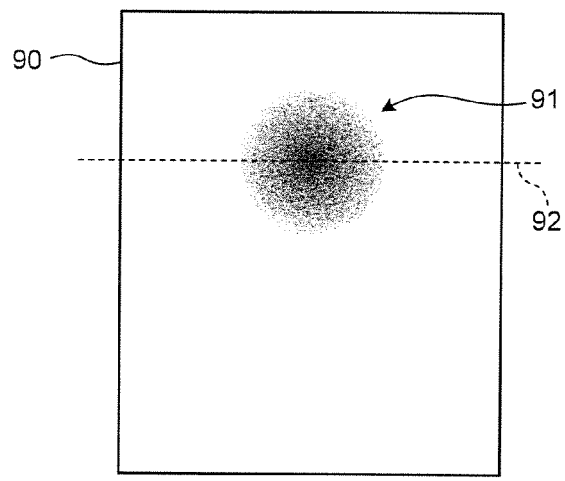
FIG. 16 is an explanatory diagram of an image having a light-unevenly-distributed portion.
Figure 17:
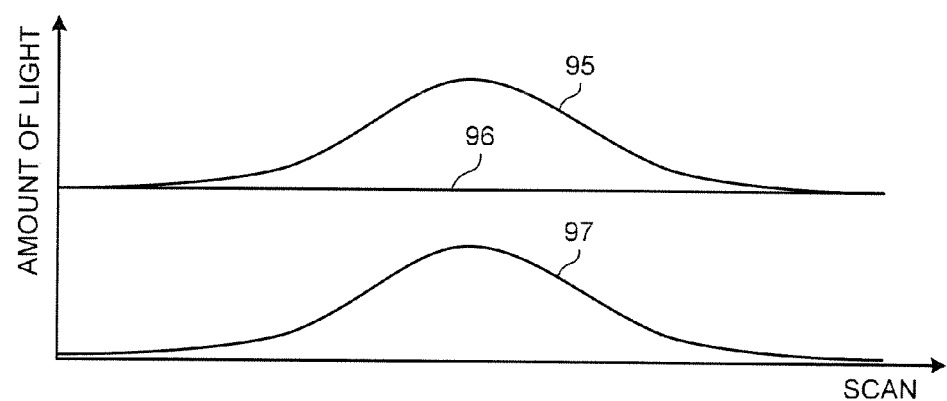
FIG. 17 is an explanatory diagram of light amount obtained from a photographed image.

FIG. 16 is an explanatory diagram of an image including a portion where uneven distribution of light amount occurs (hereinafter, uneven-light amount portion). FIG. 17 is an explanatory diagram of amount of light obtained from a photographed image. When extracting an image obtained with illuminating light emitted from the lighting LED 39, at a predetermined scan position 92 of image data 90 which is data of an image photographed with the lighting LED 39 in the turned-on state (hereinafter, light-on image data 90), light amount, or amount of light, is obtained based on the light-on image data 90. The light amount obtained at this stage is light amount of total light 95 which is a sum of the illuminating light from the lighting LED 39 and ambient light 96 being incident on the photographed area 7 from the background, or environment, of the image capturing system 1. In the total light 95, light amount varies in response to the uneven-light amount portion 91, when the uneven distribution of light amount generated based on illuminating light from the lighting LED 39 is generated on the scan portion 92 of light-on image data 90, as the uneven-light amount portion 91. More specifically, regarding the light amount of the total light 95, light amount at the uneven-light amount portion 91 is higher than light amount in the other portion on the scan position 92.

Figure 18:
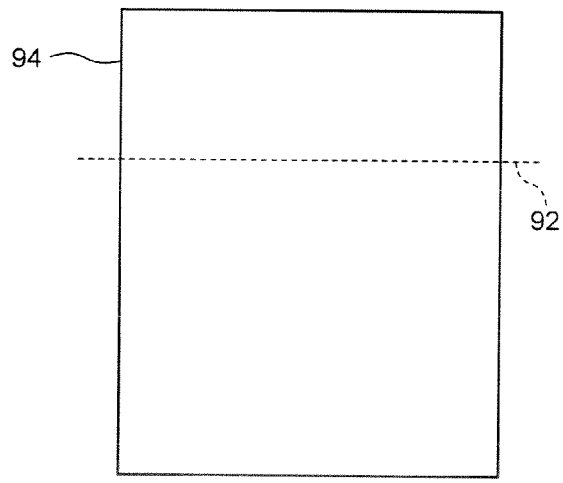
FIG. 18 is an explanatory diagram of an image photographed with the lighting LED off.

FIG. 18 is an explanatory diagram of an image photographed with the lighting LED 39 turned off. After obtaining the light amount of the total light 95 in the turned-on state of the lighting LED 39, at the scan position in image data 94 of an image photographed with the lighting LED 39 in the turned-off state (hereinafter, light-off image data 94), light amount is obtained based on the light-off image data 94. The scan position 92 is on the same position as that in the light-on image data 90 from which the light amount of the total light 95 is obtained. Since the light amount obtained based on the light-off image data 94 does not include light amount of the illuminating light from the lighting LED 39, the light amount is of only the ambient light 96 being incident on the photographed area 7 from the environment of the image capturing system 1. The light amount of the ambient light 96 does not include the light amount of the uneven-light amount portion 91. The light amount of the ambient light 96 as a whole is lower than the light amount of the total light 95 at every point.

When the light amount of the total light 95 and the light amount of the ambient light 96 have been obtained as described above, the difference between these light amounts are calculated. The light amount obtained as the difference is a difference between the light amount of the total light 95, into which the illuminating light from the lighting LED 39 and the ambient light 96 are combined, and the light amount of the ambient light 96, therefore, the light amount obtained as the difference equals to the light amount of self-illuminating light 97 which is emitted light from the lighting LED 39. In other words, the light amount of the self-illuminating light 97 are light amount of light emitted onto the scan position 92 in a state where the lighting LED 39 is on. The uneven-light amount portion 91 results from magnitude of the light amount of the self-illuminating light 97 or distribution of the light amount of the self-illuminating light 97. For this reason, the determination as to whether or not there is the non-readable area 62 may preferably be made based on the self-illuminating light 97 obtained as described above.

For example, the determination may be made based on, whether or not the light amount of the self-illuminating light 97 is equal to or lower than a predetermined threshold value. More specifically, when the light amount of the self-illuminating light 97 includes a light amount higher than the threshold value, it is determined that there is the uneven-light amount portion 91, and, accordingly, it is determined that there is the non-readable area 62.

Alternatively, there may be employed another method for determining whether or not the non-readable area 62 is generated based on the light amount of the self-illuminating light 97. For example, the determination may be made based on whether or not width between peaks of the light amount of the self-illuminating light 97 is equal to or lower than a predetermined threshold value. More specifically, the difference between a light amount at a point where the light amount of the self-illuminating light 97 is the highest and that at a point where the light amount of the self-illuminating light 97 is the lowest exceeds the predetermined threshold value, the non-readable area determining unit 25 determines that there is the uneven-light amount portion 91 and, consequently, the non-readable area determining unit 25 determines that there is the non-readable area 62.

As described above, whether or not the non-readable area 62 is generated may be determined based on the light amount of the self-illuminating light 97 that are obtained from the light-on image data 90 and the light-off image data 94, which are obtained with the lighting LED 39 turned on and off, respectively. Making the determination using such a method enables to determine whether or not the non-readable area 62 is generated when the lighting LED 39 is turned on, appropriately, even when the medium 6 is of a material on which luminance does not become extremely high locally and uneven-light amount portion 91 is generated when the lighting LED 39 is in the turned-on state, such as a semi-glossy medium.

In the image capturing system 1 described above, the image data 60 obtained by photographing using the smartphone 2 is stored in the recording unit 24 of the smartphone 2. Alternatively, the image data 60 may be stored in storage other than that of the smartphone 2. For example, after photographing is performed by the smartphone 2, the image data 60 may be transferred to the lighting device 3 and stored in the lighting device 3. Further alternatively, the image data 60 may be transferred to an external server and stored in the external server.

In the image capturing system 1 described above, the smartphone 2 is used as the image capturing device that photographs the medium 6 placed on the medium installation face 5. Alternatively, an image capturing device other than the smartphone 2 may be used. For example, a digital camera capable of communicating with the lighting device 3 may be used as the image capturing device. Any device or apparatus capable of carrying out communication with the lighting device 3 and performing photographing in response to a scan trigger transmitted from the lighting device 3 can be used as the image capturing device.

According to an aspect of the present invention, an image capturing system allows obtaining a high-quality image appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image capturing system comprising:
 a lighting device including:
  a base unit arranged on a medium installation face on which a medium to be read is placed;
  an arm unit extending upward from the base unit;
  a top unit extending from the arm unit so as to face the medium installation face;
  a lighting unit disposed in the top unit to irradiate the medium installation face;
  a lighting control unit configured to perform driving control of the lighting unit; and a scan instruction unit arranged on the base unit and configured to issue an instruction to perform scanning to photograph the medium, and to generate image data corresponding to the medium; and an image capturing unit configured to photograph the medium based on the instruction to perform scanning, the image capturing unit mounted on the top unit so as to be capable of mounting or dismounting, the image capturing unit including:

a communication unit configured to wirelessly communicate with the lighting device; and a non-readable area determining unit configured to determine whether or not there is a non-readable area at which information from the medium is unable to be read by the image capturing unit due to reflection of light that is emitted from the lighting unit and reflected at the medium, based on an image corresponding to the medium obtained by photographing the medium in a turned-on state of the lighting unit, after the instruction to perform scanning is issued and before the image data is generated, wherein when the non-readable area determining unit determines that there is the non-readable area, the scanning is performed in the state that there is not the non-readable area in any parts of the medium by turning off the lighting unit by the lighting control unit when the lighting unit is in a turned-on state, and when the non-readable area determining unit determines that there is not the non-readable area, the scanning is performed in the turned-on state of the lighting unit.

2. The image capturing system according to claim 1, wherein when the instruction to perform scanning is issued in the turned-off state of the lighting unit, the scanning is performed maintaining the turned-off state of the lighting unit.

3. The image capturing system according to claim 1, wherein the driving control is performed through pulse width modulation (PWM) control, and when the non-readable area determining unit determines that there is not the non-readable area, the scanning is performed with the lighting unit lit at 100% duty ratio of the PWM control.

4. The image capturing system according to claim 1, wherein after the scanning is performed, the lighting control unit resets a lighting state of the lighting unit to a lighting state before the scanning is performed.

5. The image capturing system according to claim 1, further comprising a notifying unit configured to notify that there is the non-readable area on an image corresponding to the medium obtained by photographing with the image capturing device, wherein when the non-readable area determining unit determines that there is the non-readable area, the notifying unit notifies that there is the non-readable area in the image corresponding to the medium obtained by photographing with the lighting unit in the turned-on state.

6. The image capturing system according to claim 1, wherein when the non-readable area determining unit determines that there is the non-readable area, the scanning is performed in the turned-on state and in the turned-off state of the lighting unit, and both image data obtained in the turned-on state and image data obtained in the turned-off state are stored.

7. The image capturing system according to claim 1, wherein responsive to the determination that there is the non-readable area, the scanning is performed by irradiating the medium with no light.

* * * * *